US009602391B2

(12) United States Patent
Wang et al.

(10) Patent No.: US 9,602,391 B2
(45) Date of Patent: Mar. 21, 2017

(54) NETWORK APPARATUS AND METHOD FOR COMMUNICATION BETWEEN DIFFERENT COMPONENTS

(71) Applicant: Hangzhou H3C Technologies Co., Ltd., Hangzhou (CN)

(72) Inventors: Ju Wang, Beijing (CN); Shunlin Zhou, Beijing (CN); Rui Wang, Beijing (CN); Chi Fan, Beijing (CN); Haidong Wang, Beijing (CN); Guohua Chen, Beijing (CN); Shilin Zhang, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 102 days.

(21) Appl. No.: 14/731,222

(22) Filed: Jun. 4, 2015

(65) Prior Publication Data
US 2015/0334003 A1    Nov. 19, 2015

Related U.S. Application Data

(63) Continuation of application No. 12/442,838, filed as application No. PCT/CN2007/001523 on May 9, 2007, now Pat. No. 9,083,565.

(30) Foreign Application Priority Data

Sep. 25, 2006    (CN) .......................... 2006 1 0139788
Sep. 25, 2006    (CN) .......................... 2006 1 0139795
(Continued)

(51) Int. Cl.
*H04L 12/28*    (2006.01)
*H04L 12/721*   (2013.01)
(Continued)

(52) U.S. Cl.
CPC .......... *H04L 45/14* (2013.01); *G06F 13/4221* (2013.01); *H04L 12/403* (2013.01); *H04L 12/66* (2013.01)

(58) Field of Classification Search
USPC .......................... 370/252, 389, 401, 419, 463
See application file for complete search history.

(56) References Cited

U.S. PATENT DOCUMENTS 4,894,823 A    1/1990   Adelmann et al.
6,669,096 B1   12/2003  Saphar et al.
(Continued)

FOREIGN PATENT DOCUMENTS

CN    1399475    2/2003
CN    1471267    1/2004
(Continued)

OTHER PUBLICATIONS

Extended European Search Report dated Mar. 1, 2013, EP Patent Application No. 07721096.1 dated Mar. 31, 2013, European Patent Office.
(Continued)

*Primary Examiner* — John Pezzlo
(74) *Attorney, Agent, or Firm* — Hewlett Packard Enterprise Patent Department

(57) ABSTRACT

The present invention discloses a method for communication among different components, including integrating a Network Forwarding Component (NFC) for forwarding messages and at least one Independent Application Component (IAC) for performing other service processing into one network device; setting at least one cooperation mode in the NFC and each of the at least one IAC; and communicating with each other, by the NFC and the at least one IAC, according to the at least one cooperation mode. The cooperation mode may be any or any combination of a host mode,
(Continued)

a mirror mode, a redirection mode and a pass-through mode. According to the present invention, the NFC and the IAC may communicate according to the cooperation mode so as to ensure that the NFC and the IAC can cooperate to provide various service capabilities including message forwarding and other additional service capabilities.

20 Claims, 15 Drawing Sheets

(30) Foreign Application Priority Data

| | | |
|---|---|---|
| Oct. 17, 2006 | (CN) | 2006 1 0140946 |
| Oct. 18, 2006 | (CN) | 2006 1 0152808 |
| Oct. 31, 2006 | (CN) | 2006 1 0137617 |
| Nov. 8, 2006 | (CN) | 2006 1 0138619 |
| Nov. 8, 2006 | (CN) | 2006 1 0138620 |

(51) Int. Cl.
*G06F 13/42* (2006.01)
*H04L 12/403* (2006.01)
*H04L 12/66* (2006.01)
*H04J 1/16* (2006.01)

(56) References Cited

U.S. PATENT DOCUMENTS

| | | |
|---|---|---|
| 6,934,284 B1 | 8/2005 | Danielson et al. |
| 7,228,337 B1 | 6/2007 | Bornstein et al. |
| 7,423,962 B2 | 9/2008 | Auterinen |
| 7,467,198 B2 | 12/2008 | Goodman et al. |
| 7,554,959 B1 | 6/2009 | Dowling |
| 7,590,727 B1 | 9/2009 | Barnes |
| 7,657,916 B2 * | 2/2010 | Rodriguez ......... H04N 5/44543 725/115 |
| 7,765,328 B2 | 7/2010 | Bryers et al. |
| 7,849,502 B1 | 12/2010 | Bloch et al. |
| 7,912,856 B2 | 3/2011 | Hannel et al. |
| 8,010,617 B2 | 8/2011 | Zhuo et al. |
| 2002/0194412 A1 | 12/2002 | Bottom |
| 2003/0014370 A1 | 1/2003 | Charrin |
| 2004/0095943 A1 | 5/2004 | Korotin |
| 2006/0020854 A1 | 1/2006 | Cardona et al. |
| 2006/0045089 A1 | 3/2006 | Bacher et al. |
| 2006/0095643 A1 | 5/2006 | Baba et al. |
| 2007/0266108 A1 | 11/2007 | Patterson et al. |
| 2014/0355606 A1 * | 12/2014 | Riddoch ............... H04L 12/18 370/390 |

FOREIGN PATENT DOCUMENTS

| | | |
|---|---|---|
| CN | 1510868 | 7/2004 |
| CN | 1533108 | 9/2004 |
| CN | 1592300 | 3/2005 |
| CN | 1607772 | 4/2005 |
| CN | 1764080 | 4/2006 |
| WO | WO-2006/035059 | 4/2006 |

OTHER PUBLICATIONS

International Search Report dated Aug. 23, 2007, PCT Patent Application No. PCT/CN2007/001523.

* cited by examiner

NETWORK APPARATUS AND METHOD FOR COMMUNICATION BETWEEN DIFFERENT COMPONENTS

CLAIM FOR PRIORITY

The present application is a Continuation of national stage application Ser. No. 12/442,838 filed on Mar. 25, 2009, which claims priority to PCT application number PCT/CN2007/001523, having an international filing date of May 9, 2007, which claims priority to Chinese application 200610139788.X filed on Sep. 25, 2006, Chinese application 200610139795.X filed on Sep. 25, 2006, Chinese application 200610140946.3 filed on Oct. 17, 2006, Chinese application 200610152808.7 filed on Oct. 18, 2006, Chinese application 200610137617.3 filed on Oct. 31, 2006, Chinese application 200610138619.4 filed on Nov. 8, 2006, Chinese application 200610138620.7 filed on Nov. 8, 2006 the disclosures of which are hereby incorporated by reference in their entireties.

FIELD OF THE INVENTION

The present invention relates to network communication technologies, and particularly, to a network apparatus and a method for communication between different components.

BACKGROUND OF THE INVENTION

With ever-developing network technologies, network devices have been adopted for forwarding messages. However, since varieties of services, including audio and video services, have been integrated into conventional data communication networks, network devices are expected to implement more service processing when forwarding a message than just forwarding the message. For example, a network device is required not only to forward messages, but also to undertake processing of telephone calls and faxes, to collect specified service statistics, to calculate fees, to carry out security-related measures and to monitor and regulate traffic flows so that the network may achieve the best performance and stay in an acceptable state.

A conventional solution for carrying out multiple service procedures in forwarding a message includes interconnecting multiple network devices having different service capabilities, in which case the multiple service procedures are carried out through collaboration of the multiple network devices. Because different network devices are usually produced by different manufacturers, the above solution has disadvantages such as high costs of devices, poor interoperability between devices and inconvenience in management and maintenance.

At present, in Personal Computer (PC) industry, with the release of multiple industry standards, a PC can be equipped with multiple service capabilities by installing PCI cards from different manufacturers on one PC through a PCI bus.

It is expected that the method adopted by the PC industry may be adopted for integrating components capable of forwarding messages and components with other service capabilities into one network device, so that varieties of service procedures can be implemented in the process of forwarding messages by the network device with improved interoperability between devices from different manufacturers and lowered cost of the device. However, according to the conventional art, the internal connection and communication manner adopted in integrating PCI cards into a PC via a PCI bus is only suitable for PCs, and such connection and communication manner cannot be applied to network communications. When different components with different service capabilities are integrated into one network device, it is a technical problem yet to be solved that how to communicate between these different components in the network device to enable the components to work together to carry out various service procedures.

SUMMARY OF THE INVENTION

The present invention provides a method for communication between different components, a network device, a Network Forwarding Component (NFC) and an Independent Application Component (IAC) to enable the communication between different components in a network device, i.e., the NFC and the IACs, so that the NFC and the IACs may cooperate with each other.

To achieve the above objectives, the present invention provides the following technical solutions.

A method for communication between different components comprises:

integrating a Network Forwarding Component, NFC, for forwarding messages and at least one Independent Application Component, IAC, for performing other service processing into one network device;

setting a cooperation mode and cooperation mode-related configuration information in the NFC and each of the at least one IAC; and communicating with each other, by the NFC and the at least one IAC, according to the cooperation mode and the cooperation mode-related configuration information.

A network device includes: a Network Forwarding Component (NFC) for forwarding messages and more than one Independent Application Component (IAC) for providing other service capabilities, wherein the NFC, connected to the IACs, is adapted to obtain cooperation mode and cooperation mode-related configuration information, transmit service information to the IACs according to the cooperation mode and the cooperation mode-related configuration information, and receive service information from the IACs; and the IAC, connected to the NFC, is adapted to obtain the cooperation mode and the cooperation mode-related configuration information, transmit service information to the NFC according to the cooperation mode and the cooperation mode-related configuration information, and receive service information from the NFC.

A Network Forwarding Component (NFC) includes a processing unit and an interface unit, wherein the processing unit is adapted to obtain the cooperation mode and cooperation mode-related configuration information from the interface unit, transmit service information to the interface unit according to the cooperation mode and the cooperation mode-related configuration information, and receive and process service information of an Independent Application Component, IAC, sent by the interface unit; and the interface unit is adapted to receive the cooperation mode and the cooperation mode-related configuration information, send the cooperation mode and the cooperation mode-related configuration information to the processing unit, forward the service information from the processing unit to the IAC, and forward service information from the IAC to the processing unit.

An Independent Application Component (IAC) includes a processing unit and an interface unit, wherein the processing unit is adapted to obtain cooperation mode and the cooperation mode-related configuration information from the interface unit, transmit service information to the interface unit according to the cooperation mode and the cooperation mode-related configuration information, and receive and process service information of a Network Forwarding Component, NFC, from the interface unit; and the interface unit is adapted to receive the cooperation mode and the cooperation mode-related configuration information, send the cooperation mode and the cooperation mode-related configuration information to the processing unit, forward service information from the processing unit to the NFC, and forward service information from the NFC to the processing unit.

It can be seen that, in the present invention, a cooperation mode and cooperation mode-related configuration information are set in the NFC for forwarding message and the IACs for providing other service capabilities, therefore the NFC and the IACs can communicate with each other according to the cooperation mode. Thereby, the different components in one network device will not be incapable of communicating with each other due to incompatibility of working modes of the components any more, and the NFC and the IACs may cooperate in forwarding messages and providing various additional service capabilities.

Furthermore, according to the present invention, the NFC and the IACs may perform various kinds of communications under different working modes, e.g., communication for performing a master/slave backup between different IACs, communication between the NFC and the IACs for performing associated actions, etc., hence the flexibility and the service diversity can be enhanced significantly and the service quality can be improved.

DETAILED DESCRIPTION OF THE INVENTION

Figure 1:
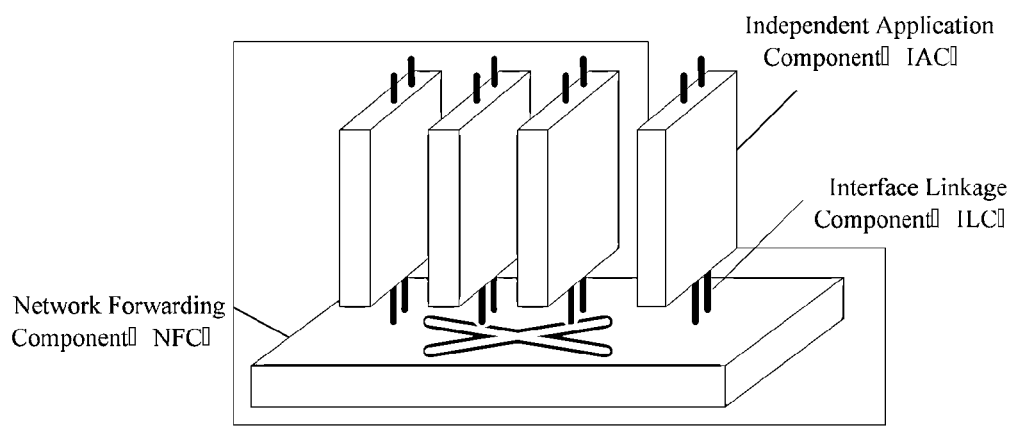
FIG. 1 is a schematic illustrating the structure of an OAA system.

In view of the conventional method of integrating different PCI cards into a PC via a PCI bus to provide multiple service capabilities, the present invention designs an open software/hardware architecture named Open Application Architecture (OAA). FIG. 1 is a schematic illustrating the structure of the OAA system. As shown in FIG. 1, in the OAA system, components from different manufacturers are integrated into a loosely coupled system, which mainly includes: a Network Forwarding Component (NFC), one or more Independent Application Components (IAC) and corresponding Interface Linkage Components (ILC), wherein the NFC and the IACs are connected via the ILCs.

In the OAA system, the NFC is adapted to perform message delivery with functions of a router or a switch. The NFC is usually embodied by the main body of a router or a switch in the OAA, including a frame and a single board. The NFC can also be an exchange device with slots capable of accepting additional cards. The IAC, usually a single board or a mezzanine card, is adapted to provide additional service functions. Since each IAC has a respective processor, the IACs can provide different service capabilities by programming the processors properly, i.e. collecting service-related statistics for specific services, calculating fees and carrying out security-related measures. The ILC is usually integrated into both the NFC and the IAC as interfaces providing a path via which messages and control information are communicated between the NFC and the IAC.

In practical applications, according to the above designed OAA structure, a component fulfilling message forwarding is regarded as an NFC and a component providing other service functions is regarded as an IAC. In a first step, the different components regarded as the NFC and the IACs are integrated via ILCs to form a network device with multiple service functions and with loosely coupled internal components. In a second step, cooperation mode and cooperation mode-related configuration information are set up in the NFC and the IACs. In a third step, the NFC and the IACs communicate with each other according to the cooperation mode and cooperation mode-related configuration information. In this way, the NFC and the IACs are enabled to communicate with each other and cooperate to provide varieties of service capabilities.

The following description explains in detail how to integrate the NFC and the IACs into one network device via the ILCs in accordance with an embodiment of the present invention.

Figure 2:
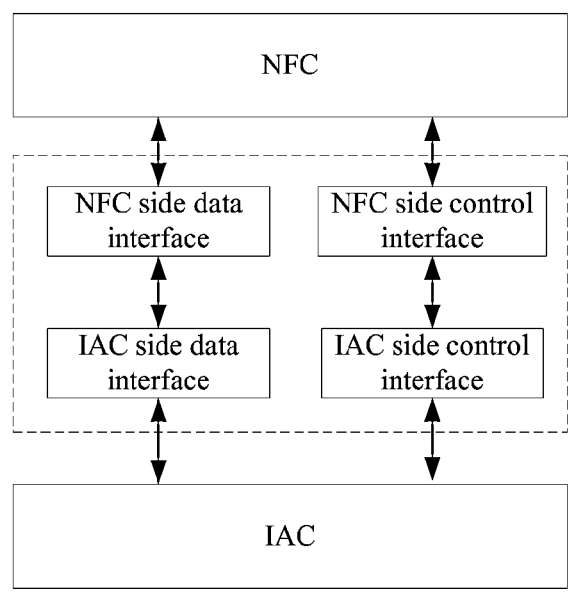
FIG. 2 is a schematic illustrating the integration of an NFC and an IAC in accordance with an embodiment of the present invention.

FIG. 2 is a schematic illustrating the integration of an NFC and an IAC in accordance with an embodiment of the present invention. As shown in FIG. 2, an ILC includes a data interface and a control interface. Since the ILC is typically integrated into the NFC and the IAC respectively as interfaces, the ILC in an NFC includes an NFC side data interface and an NFC side control interface, and the ILC in an IAC includes an IAC side data interface and an IAC side control interface. Therefore the NFC and the IAC are integrated into one network device via respective data interfaces and control interfaces established in the NFC and the IAC.

In practical applications, the data interfaces in the NFC and the IAC may be Ethernet interfaces.

The control interfaces integrated in the NFC and the IAC may be universal serial interfaces, e.g., Universal Asynchronous Receiver/Transmitters (UART). When the UARTs are adopted, the UART on the NFC side may be connected directly to a local bus of the processor of the NFC to function as an NFC side serial interface; and the UART on the IAC side may be connected directly to the local bus of the processor of the IAC to function as an IAC side serial interface.

In the present invention, the control interfaces in the NFC and the IAC may also be Ethernet interfaces imitating serial interfaces instead of universal serial interfaces. Specifically, an Ethernet interface can be added to each of the NFC and the IAC respectively to imitate a serial interface, or the Ethernet interfaces that function as the data interfaces on the NFC side and on the IAC side respectively are multiplexed to imitate the serial interfaces on each side.

Preferably, a power supply interface may also be established between the NFC and the IAC in accordance with the present invention. The NFC supplies power to the IAC through the power supply interface so that the IAC does not need external power supply and at the same time the NFC and the IAC are more closely integrated. Different types of power supply interfaces may be adopted, such as a Universal Serial Bus and other power supply interfaces as such.

According to the above method of integrating an NFC and an IAC, the NFC can be integrated with at least one IAC into a network device. The method can be applied to integration of an NFC and each IAC, hence the integration method is easy in implementation and provides good extendibility.

After the NFC and the IAC are integrated into one network device, the NFC and the IAC may be powered on respectively and the procedure of powering on the NFC and the IAC is identical to that in the prior art. For example, when the NFC is a router, run the program in a Read-Only Memory (ROM) first, then start the system self-check and boot procedures, after that run an Internetwork Operation System (IOS) in a Flash memory to search for router settings and load the router settings into a DRAM. The procedure of an IAC starting up usually includes running the program in a ROM and initiating the system self-check and boot procedures.

According to the present invention, for the physical structure of the network device into which the NFC and the IAC are integrated and for the varieties of services to be provided by cooperation of the NFC and the IAC, four cooperation modes, namely the host mode, the mirror mode, the redirecting mode and the pass-through mode, may be adopted by the NFC and the IAC in communication and cooperation.

1. Host Mode.

In the host mode, the NFC forwards messages to the IAC via a forwarding channel, i.e., the IAC functions as a terminal in the network with its own IP address, just like a host computer in the network. The messages are forwarded via an Ethernet interface of the ILC, which is logically referred to as the forwarding channel. The coupling relation between the NFC and the IAC in this mode is the loosest. The NFC just forwards messages and the IAC transmits and receives messages as the source or the destination of data messages with the NFC being a gateway of the IAC.

2. Mirror Mode.

In the mirror mode, the NFC sends a duplicate of a message which satisfies a pre-determined mirror condition to the IAC via a mirror channel when forwarding messages. In other words, while forwarding messages, the NFC duplicates a message which satisfies the predetermined mirror condition, sends the duplicated copy of the message to the IAC, and forwards the original message as normal. After receiving the message, the IAC analyzes and processes the messages according to internal service logics of the IAC. The mirror channel is a unidirectional logical channel, i.e., a channel through which the data are always transmitted from the NFC to the IAC.

The mirror mode is usually adopted in an Invasion Detection System (IDS) and the IAC functions as an IDS. An IDS is usually serially connected to a network device. In this mode, the IDS filters traffic flows that pass through the network device (e.g., a LanSwitch) to detect attacks in real time.

3. Redirection Mode.

In the redirection mode, the NFC redirects a message that satisfies a predetermined redirection condition to the IAC in the process of forwarding messages. The IAC analyzes and processes the message, such as discards a message or returns a message without changing it. When the message is unchanged and returned to the NFC, the NFC continues the forwarding process from where the process is suspended. In this mode, the redirected messages are also forwarded via an Ethernet interface of the ILC. The redirection mode is usually adopted in an Invasion Protection System (IPS) with the IAC functioning as an IPS.

4. Pass-Through Mode

In the pass-through mode, the IAC forwards a message to the NFC via a penetrating channel. In this mode, the IAC has no IP address and the IAC always has an external Ethernet interface through which data are fed in. Then a data flow passes through the IAC and finally arrives at the NFC through an Ethernet interface of the ILC. The data flow may also be transmitted in the reverse direction. For the NFC, the data flow appears to be received directly from an external device by the Ethernet interface of the ILC and the IAC appears to be non-existent. Actually, the IAC keeps a record of the data flow passing through the IAC and makes analysis, and may further modify the messages when necessary to complete certain service functions. In this mode, the data flow is forwarded through an Ethernet interface of the ILC, which is referred to as a penetration channel. The NFC treats the penetration channel as a normal Ethernet interface and does not perform any special logical processing to the penetration channel. For the IAC, the penetration channel is treated as a Layer-2 Ethernet interface, while the forwarding channel is treated as a Layer-3 Ethernet interface.

In practical applications, the NFC and the IAC may be configured to collaborate in any one or any combination of the above four cooperation modes, hence according to the present invention, the cooperation mode of the NFC and the IAC may be set, before the NFC and the IAC are integrated into one network device, e.g., when the NFC and the IAC are manufactured, to any one or any combination of the above four cooperation modes.

After the integrating procedure in the first step is performed and the NFC and the IAC are started up, the IAC may register at the NFC on its own initiative to specify some attributes of the IAC, such as the software version of the IAC, the identity of the IAC (IAC ID), the Media Access Control (MAC) address of the IAC and the listening port of the IAC. After receiving the registration information, the NFC records the registration information which is used for distinguishing different IACs. Furthermore, the NFC responds to the registration information with a register response which may carry a default cooperation mode and the MAC address of the NFC. After receiving the register response, the IAC sets up local default cooperation mode according to the default cooperation mode of the NFC carried in the register response.

The following description will explain the above second step, i.e., setting the cooperation mode and cooperation mode-related configuration information in the NFC and the IAC so that the communication in the follow-up step will be carried out successfully.

Either of the following two methods may be adopted for setting the cooperation mode and cooperation mode-related configuration information:

the first configuration method is to configure the NFC and the IAC respectively;

the second configuration method is to configure both the NFC and the IAC through the NFC.

The second configuration method is a preferred configuration method. According to the second configuration method, only one user control interface is to be established in the NFC and an administrator only needs to be connected to the user control interface of the NFC for configuring the NFC and the IAC. The procedure is simple and ensures that the configurations of the NFC and the IAC are always identical. The structure of the IAC is also much simpler since the IAC no longer needs to provide a separate user control interface for external connection. The second method is explained hereinafter in detail.

In the integration process in the first step, when both the control interfaces of the NFC and the IAC are serial interfaces working in stream mode, the NFC and the IAC may set up internal interface lines for respective control interfaces. Further, the NFC may set up an external interface line for the user control interface in the NFC. The information inputted through the external interface line of the NFC is output directly to an NFC side internal interface line connected to the IAC, therefore IAC core may receive the byte flow of the configuration management command from the administrative terminal through an IAC side internal interface line connected to the NFC. Likewise, the processing result of the IAC core can also be transmitted to the administrative terminal via the IAC side internal interface line, the NFC side internal interface line and the NFC side external interface line. In this way the IAC is configured and managed through the NFC. In this method, the NFC side internal interface line functions as an NFC side internal control channel for transmitting byte streams. The configuration procedure is explained in detail hereinafter with reference to FIG. 3.

Figure 3:
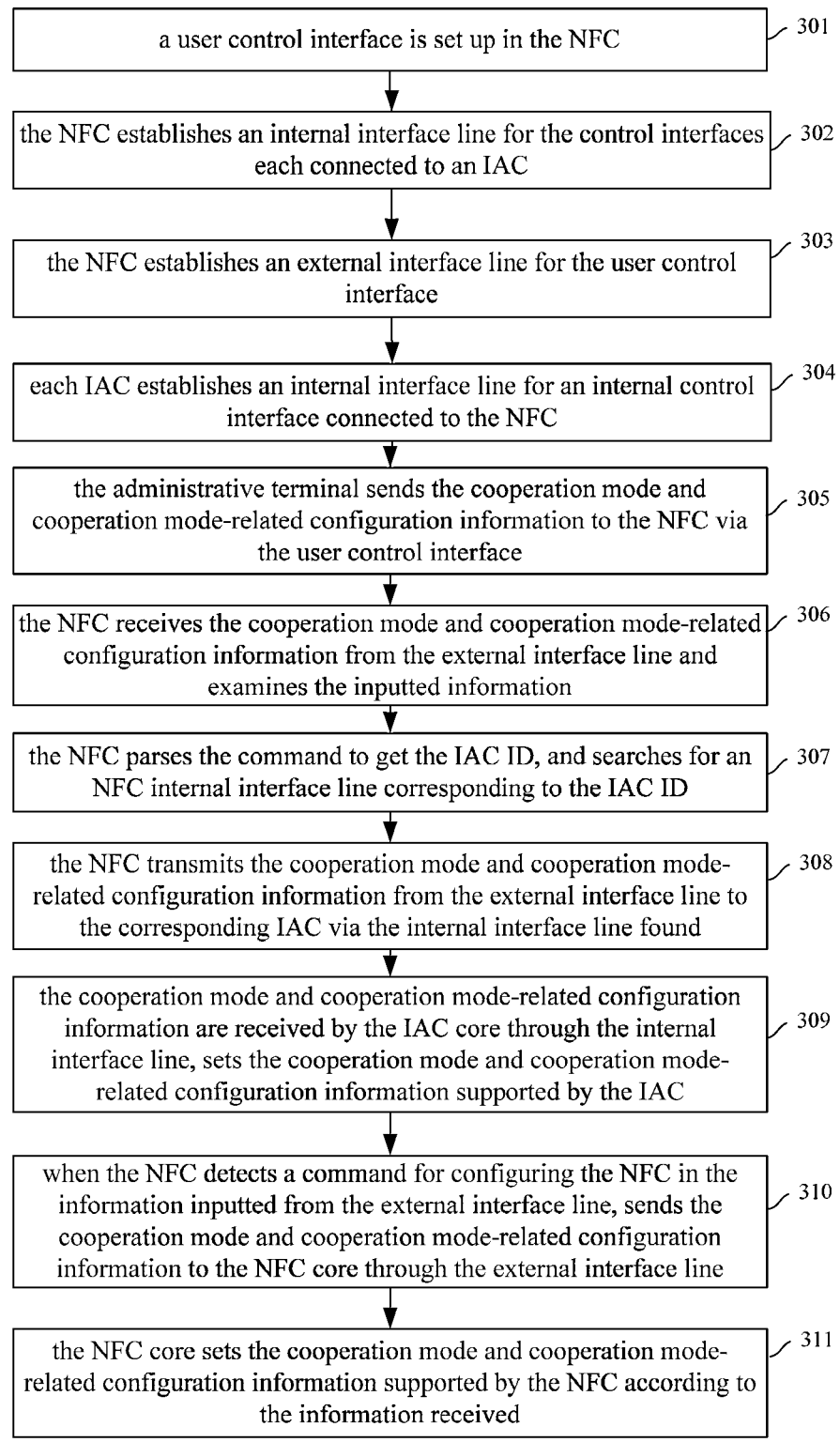
FIG. 3 is a flowchart of configuring an NFC and IACs via the NFC in accordance with an embodiment of the present invention.

FIG. 3 is a flowchart of configuring an NFC and IACs via the NFC in accordance with an embodiment of the present invention. As shown in FIG. 3, when the control interfaces in the NFC and the IACs are both serial interfaces working in stream mode, the procedure of configuring the NFC and the IACs through the NFC may include the following steps.

In step 301, a user control interface is set up in the NFC.

The user control interface may be a Console port or an Aux port, or a physical port through which an administrative terminal may log onto the NFC via Telnet.

In step 302, the NFC establishes an internal interface line for the control interfaces each connected to an IAC.

When the NFC is integrated with a plurality of IACs, the NFC also needs to establish relations between the internal interface lines and the IAC IDs while establishing internal interface lines for the control interfaces connected to the IACs. For example, when the NFC is connected to IAC 1 through internal control interface 1 and connected to IAC 2 through internal control interface 2, the NFC may establish an internal interface line 1 for the control interface 1 together with a relation between the internal interface 1 and the IAC 1, and the NFC may also establish an internal interface line 2 for the control interface 2 together with a relation between the internal interface 2 and the IAC 2.

Through the registration procedure described above, the NFC acquires the IDs of the IACs connected to the NFC side control interfaces. The IAC IDs are used by the administrative terminal and the NFC. In the process of configuring the IACs, an IAC ID is used by the administrative terminal for notifying the NFC of the to-be-configured IAC. Furthermore, an IAC ID may be customized by a user as long as the IAC ID makes the IAC distinguishable from other IACs. Since different IACs connected to a same NFC are usually installed in different slots according to an OAA system, it is recommended that the slot ID in which an IAC is installed is used as the IAC ID for simplicity in implementing the present invention.

In step 303, the NFC establishes an external interface line for the user control interface.

A user control interface may be a Console port, an Aux port or a virtual Telnet terminal port. The procedure of establishing an interface line for the port is a part of the prior art and will not be explained herein.

In step 304, each IAC establishes an internal interface line for an internal control interface connected to the NFC.

In step 305, the administrative terminal connects to the NFC via the user control interface of the NFC, instructs the NFC to enter the configuration mode, and sends the cooperation mode and cooperation mode-related configuration information to the user control interface.

When the administrative terminal is going to configure a specific IAC, the cooperation mode-related configuration information inputted by the administrative terminal shall include commands for configuring the IAC and, when the NFC is integrated with multiple IACs, further include the ID of the IAC to be configured.

In step 306, the NFC receives the cooperation mode and cooperation mode-related configuration information from the external interface line and examines the inputted information.

In this embodiment, pre-set commands to be detected by the NFC mainly refer to management commands involving starting and terminating the configuration of the IAC. The pre-set commands to be detected generally include a command for configuring the IAC and a command for terminating the configuration of the IAC. In this step, the NFC detects the pre-set commands and starts or ends the configuration of the IAC.

In step 307, when the NFC detects a command for configuring an IAC in the information inputted from the external interface line, the NFC parses the command to get the IAC ID, and searches for an NFC side internal interface line corresponding to the IAC ID.

In step 308, the NFC transmits the cooperation mode and cooperation mode-related configuration information from the external interface line to the corresponding IAC via the internal interface line found.

In step 309, the cooperation mode and cooperation mode-related configuration information are received by the IAC core through the internal interface line established by the IAC for the control interface. The IAC core sets the cooperation mode and cooperation mode-related configuration information supported by the IAC according to the information received.

Similarly, after receiving the byte stream of the configuration result returned from the IAC through the NFC side internal interface line, the NFC outputs the byte stream directly to the administrative terminal through the external interface line.

It can be seen that from the step 307 to the step 309, the NFC functions as a logical short circuit between the external interface line and the NFC side internal interface line connected to the IAC. In this way the NFC side external interface line, the NFC side internal interface line connected to the IAC and the IAC side internal interface line form an administration channel, by which the administrative terminal may configure and manage the IAC through the NFC.

It should be noted that, when the NFC is connected with only one IAC, the configuration commands in the step 307 may not include the IAC ID, and the NFC directly takes the external interface line as the input line and the NFC side internal interface line as the output line (or vice versa) after receiving a command for configuring the IAC.

After the step 308, when the NFC detects a command for terminating the configuration of the IAC in the information inputted through the external interface line, the NFC cancels the logical short circuit between the external interface line and the NFC side internal interface line.

In step 310, when the NFC detects a command for configuring the NFC in the information inputted from the external interface line, the NFC sends the cooperation mode and cooperation mode-related configuration information to the NFC core through the external interface line.

In step 311, the NFC core sets the cooperation mode and cooperation mode-related configuration information supported by the NFC according to the information received.

It should also be noted that the steps shown in FIG. 3 is not necessarily be executed in a specific order, e.g., steps 301, 302 and 304 may be executed in a random order and the steps 307 to 309 may be executed either before or after the execution of the steps 310 to 311.

In the integration procedure in the first step, when both the NFC side control interface and the IAC side control interface are serial interfaces imitated by physical ports, i.e., Ethernet interfaces, the IAC may be administrated by the NFC through reverse Telnet. When a reverse Telnet connection is established between the NFC and the IAC, the configuration commands and the execution result of the IAC can be transmitted over the reverse Telnet connection in byte streams in both directions for configuring the IAC. In this managing method, the reverse Telnet connection between the NFC and the IAC functions as an internal control channel between the NFC and the IAC for transmitting byte streams. The configuration procedure is explained in detail hereinafter with reference to FIG. 4.

Figure 4:
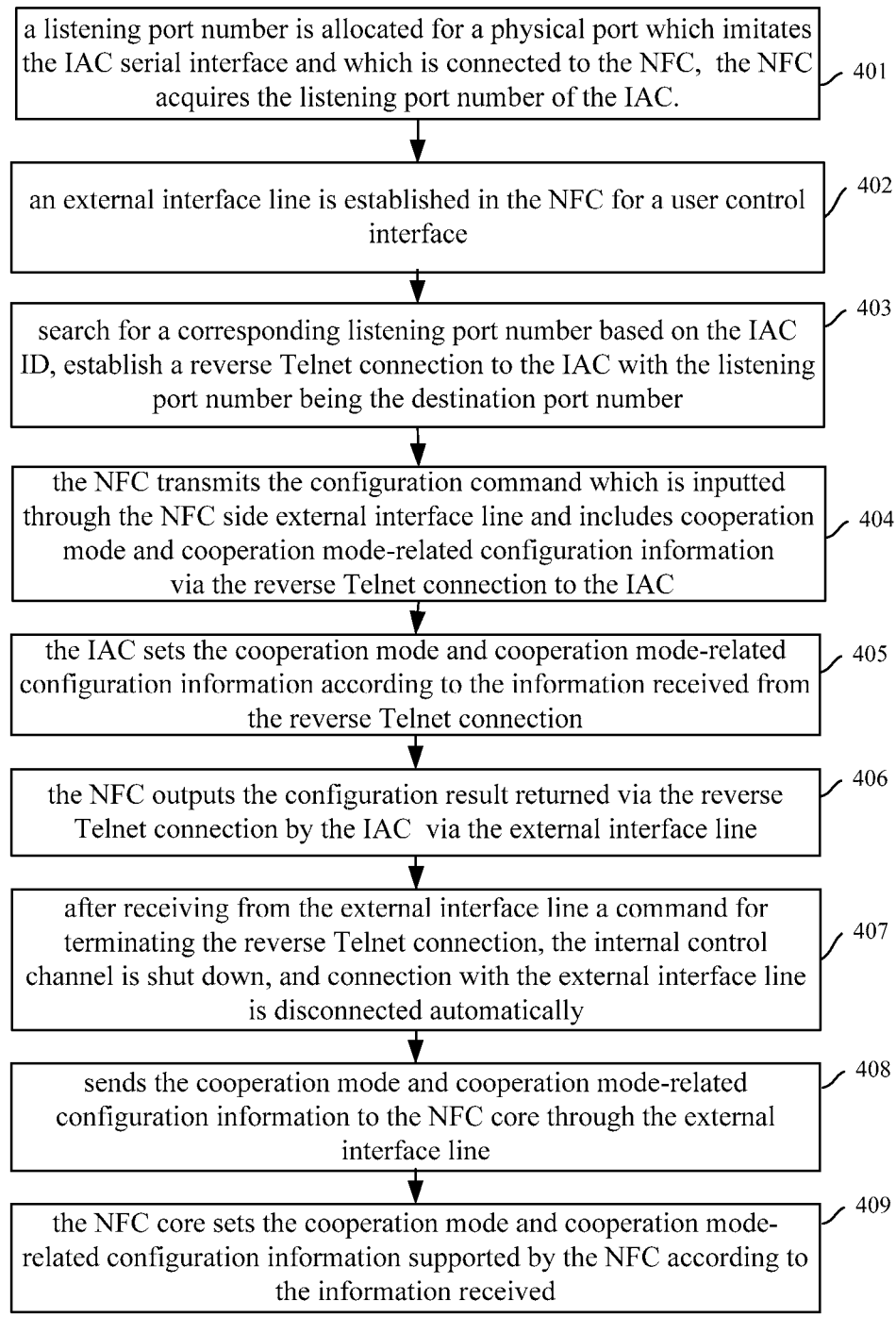
FIG. 4 is a flowchart of configuring an NFC and IACs via the NFC in accordance with an embodiment of the present invention.

FIG. 4 is a flowchart of another process of configuring an NFC and IACs via the NFC in accordance with an embodiment of the present invention. As shown in FIG. 4, when the NFC side control interface and the IAC side control interface are both serial interfaces imitated by physical ports, the procedure of configuring the NFC and the IAC through the NFC may include the following steps.

In step 401, for a physical port which imitates the IAC serial interface and which is connected to the NFC, a listening port number is allocated, and the NFC acquires the listening port number of the IAC.

The listening port number is the ID of an IAC port which is set for listening to the reverse Telnet connection request. The listening port number is used by the NFC for initiating a reverse Telnet connection with the IAC. The NFC may acquire the listening port number of the IAC in various ways. For example, when the NFC and the IAC are manufactured, the listening port number of the IAC can be set in both the NFC and the IAC, and in the current step, the NFC may acquire the listening port number of the IAC from the settings of the NFC. Alternatively, the listening port number of the IAC can be configured in the NFC and the IAC respectively through a user control interface when the NFC and the IAC are integrated in the first step, and in the current step, the NFC may acquire the listening port number of the IAC based on the configuration information. Besides, the IAC may provide the listening port number configured in the IAC for the NFC when the IAC registers at the NFC, and thereby the NFC may acquire the listening port number of the IAC.

In the current step, when the NFC is connected to multiple IACs, the NFC may also keeps a record of the relations between listening port numbers and the IAC IDs. When the NFC is connected to only one IAC, there is no need to record such relations.

In step 402, an external interface line is established in the NFC for a user control interface.

The user control interface may be a Console port, an Aux port or a virtual Telnet terminal port. The procedure of setting up an interface line for the port is part of the prior art and will not be explained herein.

In step 403, the NFC examines the information inputted from the external interface line. When a command for configuring an IAC is detected, the NFC parses the command to get the IAC ID of the to-be-configured IAC and searches for a corresponding listening port number based on the IAC ID. Then a reverse Telnet connection to the IAC is established with the listening port number being the destination port number.

When the NFC is connected to only one IAC, the command for configuring the IAC may not include the IAC ID, and on receiving the command for configuring the IAC, the NFC directly establishes a reverse Telnet connection with the IAC.

For the IAC, the reverse Telnet connection with the NFC is an internal control channel established based on the IAC side control interface, and the IAC may perform configuration operation according to the information inputted through the internal control channel and output the configuration result to the NFC through the internal control channel.

In step 404, after the reverse Telnet connection to the IAC is established, the NFC transmits a configuration command via the reverse Telnet connection to the IAC, where the configuration command is inputted through the NFC side external interface line and includes cooperation mode and cooperation mode-related configuration information.

In step 405, the IAC sets the cooperation mode and cooperation mode-related configuration information supported by the IAC according to the information received from the reverse Telnet connection.

In step 406, the NFC outputs the configuration result of the IAC via the external interface line, where the configuration result is received through the reverse Telnet connection from the IAC.

The NFC provides a logical direct connection between the internal control channel and the external interface line, through which the administrative terminal may configure and manage the IAC.

In step 407, after receiving from the external interface line a command for terminating the reverse Telnet connection, the internal control channel is shut down and the IAC configuration process is terminated.

In step 408, when the NFC detects a command for configuring the NFC in the information inputted through the external interface line, the NFC sends the cooperation mode and cooperation mode-related configuration information to the NFC core through the external interface line.

In step 409, the NFC core sets the cooperation mode and cooperation mode-related configuration information supported by the NFC according to the information received.

It should be noted that, no matter the first configuration method or the second configuration method is adopted to set the cooperation mode and cooperation mode-related configuration information for the NFC and the IAC, the cooperation mode always includes any one or any combination of the host mode, the mirror mode, the redirection mode and the pass-through mode. The cooperation mode can be decided based on the services to be provided by the network and practical conditions of the services. Furthermore, when the cooperation mode to be set includes the host mode, the cooperation mode-related configuration information shall include the IP address of the IAC so that both the NFC and the IAC may acquire the IP address of the IAC as a host computer. When the cooperation mode to be set includes the pass-through mode, the cooperation mode-related configuration information shall include the IP address of the NFC so that the IAC may make messages to penetrate the NFC and other network devices based on the IP address of the NFC.

After the configuration is completed, the NFC and the IAC may respectively store the configuration information locally. For example, the NFC may set up an interface information table to record the relation between an IAC ID, information of an IAC side interface through which the NFC is connected to the IAC, information of an NFC side interface through which the NFC is connected to the IAC, and the IP address of the IAC.

Thus, the configuration of the NFC and the IACs integrated in one network device is completed, so that both the NFC and the IACs have acquired the cooperation mode to be applied by both the NFC and the IACs and information necessary for communication between the NFC and the IACs in the cooperation mode.

With respect to the third step above, the communication procedure between an NFC and an IAC for cooperating in processing multiple services in accordance with an embodiment of the present invention is explained in detail hereinafter.

Firstly, the communication procedure in the host mode is explained.

When the cooperation mode configured for an NFC and an IAC includes the host mode, the NFC functions as a gateway and forwards messages between other network devices and the IAC. In such case, the communication procedure between the NFC and the IAC may include steps as follows. After receiving a message from an external device, the NFC checks whether the destination IP address of the message is identical with the IP address of the IAC in the cooperation mode-related configuration information when the NFC is a Layer-3 device forwarding messages based on IP address, such as a router; or the NFC checks whether the destination MAC address of the message is identical with the MAC address of the IAC in the cooperation mode-related configuration information when the NFC is a Layer-2 device forwarding messages based on MAC address, such as an exchange. If the destination IP/MAC address in the message is identical with the IP/MAC address of the IAC in the cooperation mode-related configuration information, the message will be forwarded to the corresponding IAC. When receiving the message, the IAC processes the message according to pre-set service processing strategies, such as performing traffic monitoring. When receiving a message from the IAC, the NFC forwards the message to a corresponding network device according to the destination IP address of the message when the NFC is a Layer-3 device forwarding messages based on IP addresses, or the NFC forwards the message to a corresponding network device according to the destination MAC address of the message if the NFC is a Layer-2 device forwarding messages based on MAC addresses.

In accordance with the present invention, when the NFC is integrated with multiple IACs and adopts the host mode for communication, a master/slave backup procedure can be implemented between different IACs to improve the stability of the operation. The IACs involved in the master/slave backup procedure need to have identical IP addresses in processing services, while the MAC addresses of the IACs may be different from each other. Further in the backup procedure, workloads can be balanced for different services.

Different master/slave backup procedures may be adopted and the details of the backup procedures are explained hereinafter with reference to embodiments of the present invention.

Figure 5:
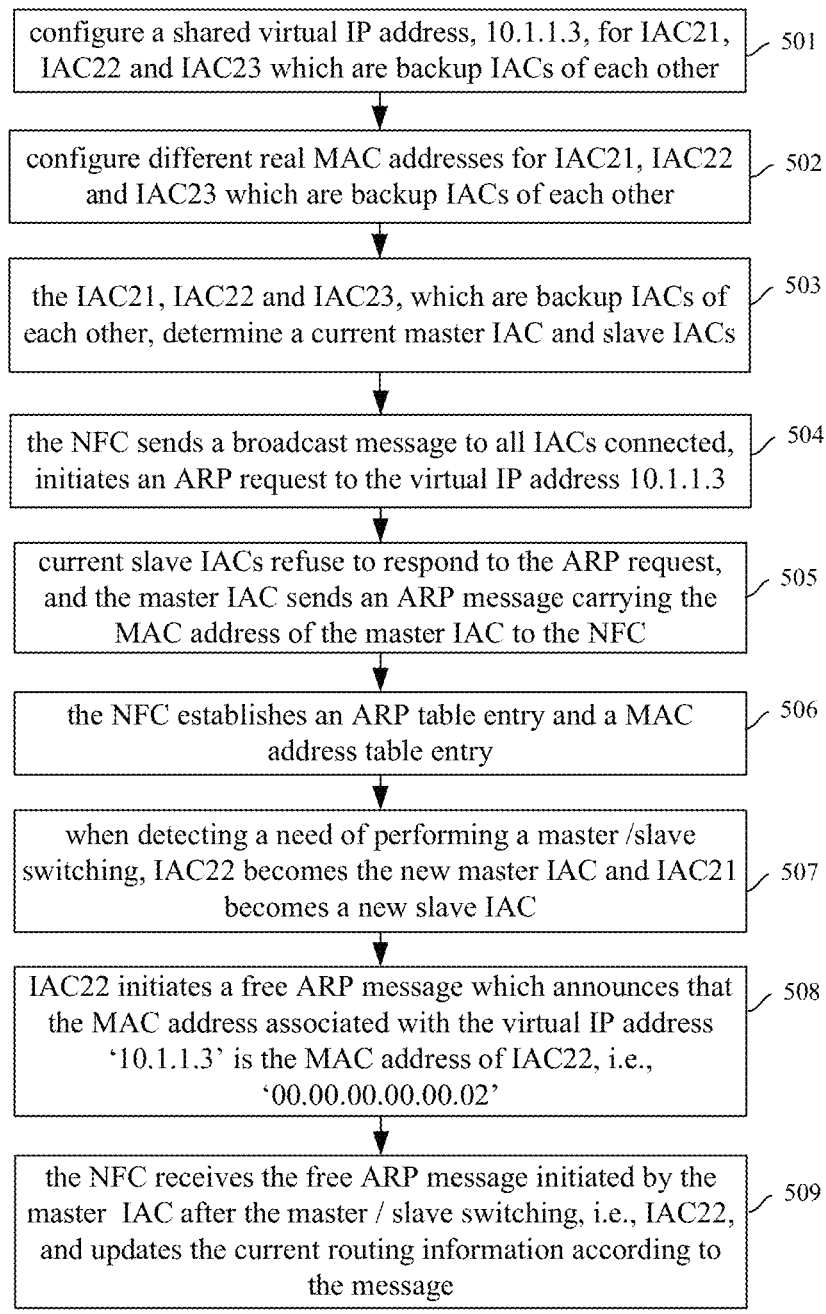
FIG. 5 is a flowchart of a master/slave backup procedure between different IACs in accordance with an embodiment of the present invention.

FIG. 5 is a flowchart of a master/slave backup procedure between different IACs in accordance with a first embodiment of the present invention. As shown in FIG. 5, the virtual IP addresses of the different IACs that perform the master/slave backup in accordance with the embodiment are identical while the MAC addresses of the IACs may be different. Thus, when the NFC and the IACs are communicating in the host mode, the master/slave backup procedure between different IACs may include the steps as follows.

In step 501, a shared virtual IP address, e.g., 10.1.1.3, is configured for the IACs which are backup IACs of each other, e.g., IAC21, IAC22 and IAC23.

The virtual IP address 10.1.1.3 is configured in all service-related settings of IAC21, IAC22 and IAC23.

In step 502, different MAC addresses are configured for IAC21, IAC22 and IAC23, which are backup IACs of each other.

The MAC address of IAC21 can be set to 00.00.00.00.00.01, the MAC address of IAC22 can be set to 00.00.00.00.00.02 and the MAC address of IAC23 can be set to 00.00.00.00.00.03.

In step 503, the IAC21, IAC22 and IAC23 determine a master IAC and slave IACs.

This step can be performed in accordance with any of the following.

Method 1: Setting master IAC and slave IACs in IAC21, IAC22 and IAC23 in advance and each of IAC21, IAC22 and IAC23 determines master IAC and slave IACs according to the settings. Method 2: Competing among IAC21, IAC22 and IAC23 to determine the master IAC and the slave IACs The completion process includes the steps described below.

1) The master IAC sends basic information messages to the slave IACs periodically which at least include the priority level of the master IAC.

2) Each IAC starts up as a slave IAC and checks whether there is already another IAC working in master mode. The IAC may face any of the following two situations when the IAC starts up: one situation is that no IAC is working in master mode, i.e., no master IAC currently exists; the other situation is that an IAC is working in master mode, i.e., a master IAC currently exists. The first situation usually happens when IACs that are backup IACs of each other have just started up, i.e., the IACs start up at almost the same time when the NFC starts up and none of the IACs is working in master mode. The latter situation usually happens when an IAC restarts after recovering from malfunctioning and another IAC is working in master mode, i.e., a master IAC exists. In addition, it should be noted that the number of the IACs that are backup of each other can be more than 2, hence in the latter situation, the OAA system may have a master IAC as well as other slave IACs in the system.

3) After receiving a basic information message from the master IAC, a slave IAC compares the priority level of the slave IAC and the priority level of the master IAC. When the priority level of the slave IAC is higher than that of the master IAC, the slave IAC becomes a new master IAC and the master IAC which sends the basic information message becomes a new slave IAC. When the priority level of the slave IAC is lower than that of the master IAC, the slave IAC remains a slave IAC. Furthermore, when the priority levels of the slave IAC and the master IAC are identical, the IP addresses of the IACs will be compared and the IAC with the smaller IP address is usually selected to be the master IAC.

4) When the slave IAC does not receive any basic information message from a master IAC in a pre-determined period of time, the slave IAC becomes a new master IAC. The pre-determined period of time is set by a user according to practical needs and is usually longer than the time interval between two successive issuances of basic information messages of the master IAC. Generally, the reason for not receiving any basic information message by the slave IAC over the pre-determined period of time may be that the master IAC malfunctions and stops working.

It should be noted that the Method 1 is applicable upon the startup of IAC21, IAC22 and IAC23 which are backup IACs of each other, and the Method 2 is applicable either upon the startup of IAC21, IAC22 and IAC23 or during the real-time communication between the IACs and the NFC after the IACs have started up when the master IAC malfunctions or when the service requires a new master IAC.

In step 504, the NFC initiates an Address Resolution Protocol (ARP) request to the virtual IP address 10.1.1.3 by transmitting a broadcast message to all IACs connected to the NFC.

In step 505, the slave IACs refuse to respond to the ARP request for the virtual IP address (10.1.1.3) from the NFC, and the master IAC sends an ARP message carrying the MAC address and the IP address of the master IAC to the NFC.

In steps 504 and 505, when receiving a message with '10.1.1.3' as the destination IP address for the first time, the NFC broadcasts an ARP request to the IP address '10.1.1.3' since the NFC has not studied the ARP-related information. Each of IAC21, IAC22 and IAC23 receives the ARP request, however, only IAC21 returns an ARP response to the NFC because IAC21 is the current master IAC. The ARP response shall inform the NFC of the MAC address of IAC21. Usually IAC22 and IAC23 discard the ARP request directly.

In step 506, the NFC establishes a relation between the virtual IP address 10.1.1.3 and the MAC address 00.00.00.00.00.01 based on the ARP message returned by IAC21, and saves the relation in an ARP table entry. Meanwhile, since the ARP message returned by IAC21 reaches the NFC through an NFC side internal data interface connected to IAC21, e.g., the data interface 1, the NFC also establishes a relation between the MAC address 00.00.00.00.00.01 and the internal data interface 1 and saves the relation in a MAC table entry.

Thereafter, each time when the NFC receives a message from an external device with 10.1.1.3 as the destination IP address, the NFC searches the ARP table entry and the MAC table entry established and found the data interface 1, then forwards the message via the data interface 1 to the master IAC, i.e., IAC21, whose MAC address is 00.00.00.00.00.01.

In step 507, when detecting a need of switching the master IAC and the slave IAC, IAC22 becomes the new master IAC and IAC21 becomes a new slave IAC.

In the step 503 above, when the current master IAC is determined, the master IAC, i.e., IAC21, issues basic information messages periodically to the slave IACs. The basic information messages may carry the IP address and priority level information of the master IAC. Thus in this step, the procedure of detecting a need of switching the master IAC and the slave IAC may further include the following steps.

When slave IAC22 and slave IAC23 have not receive any basic information message from the master IAC, i.e., IAC21, for a pre-determined period of time, IAC22 and IAC23 both switch to the master IAC mode, then an actual new master IAC will be decided based on the comparison of the priority levels and/or IP addresses of IAC22 and IAC23.

Or, when the slave IAC22 and slave IAC23 receive a basic information message from the master IAC21 within the pre-determined period of time, but IAC22 and IAC23 detect that a master/slave switching is needed based on the priority levels and/or the IP addresses of the master IAC and the slave IACs, for example, the priority level of the master IAC21 is 2 and the priority level of the slave IAC22 is 1, which indicates that the priority level of IAC22 is higher than that of IAC21, the slave IAC22 will become the new master IAC.

It should be noted that, when the system has only one slave IAC, the slave IAC shall directly become the new master IAC without the procedure of determining a new master IAC based on the IP addresses and/or the priority levels of the slave IACs as in this step.

Therefore it can be seen that, in this step, the master/slave switching may result from the malfunction of the previous master IAC, or from a change in the priority levels or IP addresses of the IACs.

In step 508, after IAC22 becomes the new master IAC, IAC22 initiates a free ARP message carrying the virtual IP address 10.1.1.3. The free ARP message also announces that the MAC address associated with the virtual IP address '10.1.1.3' shall be the MAC address of IAC22, i.e., '00.00.00.00.00.02'.

It is mentioned in the preceding description that, when IAC21 is the master IAC, the MAC address associated with the IP address '10.1.1.3' in the ARP table entry studied by the NFC is the MAC address of IAC21, i.e., '00.00.00.00.00.01'. After the master/slave switching, the NFC may update the entry only when receiving the ARP message sent by the new master IAC, i.e., IAC22.

In step 509, after receiving the free ARP message initiated by the new master IAC after the master/slave switching, i.e., IAC22, the NFC updates routing information.

To be specific, the free ARP message issued by the new master IAC, i.e., IAC22, announces that the MAC address associated with the IP address '10.1.1.3' shall be the MAC address of IAC22, i.e., '00.00.00.00.00.02'. Since the MAC address associated with the IP address '10.1.1.3' in the ARP table entry learnt by the NFC is the MAC address of IAC21, i.e., '00.00.00.00.00.01', the NFC shall update the entry according to the free ARP message to change the MAC address associated with the IP address '10.1.1.3' in the ARP table entry into '00.00.00.00.00.02' (i.e., the MAC address of IAC22 which is the new master IAC after the switching).

Furthermore, the free ARP message from IAC22 reaches the NFC via an NFC side internal data interface connected to the new master IAC, e.g., data interface 2, hence the NFC also obtains the relation between the MAC address 00.00.00.00.00.02 and the internal data interface 2. Then the NFC stores the relation into the MAC entry, and the previous MAC entry which records the relation between the MAC address '00.00.00.00.00.01' and the data interface 1 may be deleted.

After that, each time when the NFC receives a message from an external device with '10.1.1.3' as the destination IP address, the NFC searches the ARP table entry and the MAC table entry and obtains the data interface 2. And the NFC forwards the message via the data interface 2 to the master IAC, i.e., IAC22, whose MAC address is '00.00.00.00.00.02'.

It can be seen that, by issuing the free ARP message, the new master IAC, i.e., IAC22, the NFC is enabled to forward the traffic destined for the IP address '10.1.1.3' to the new master IAC (IAC22) instead of the previous master IAC (i.e., IAC21), which completes the master/slave switching procedure.

Figure 6:
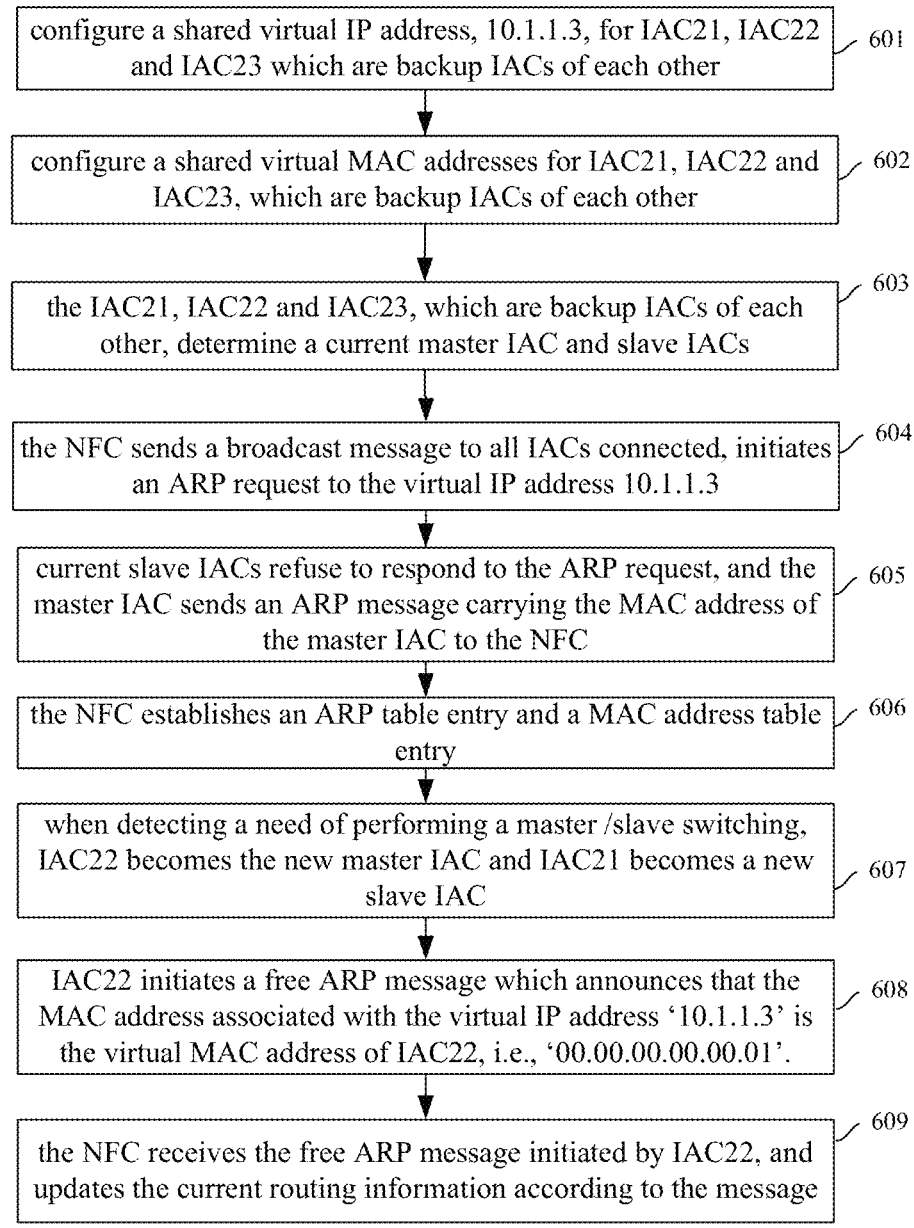
FIG. 6 is a flowchart of a master/slave backup procedure between different IACs in accordance with an embodiment the present invention.

FIG. 6 is a flowchart of a master/slave backup procedure between different IACs in accordance with a second embodiment of the present invention. As shown in FIG. 6, the different IACs that backup each other in accordance with the present invention share a same virtual IP address as well as a same virtual MAC address. When the NFC and the IACs are communicating in the host mode, the master/slave backup procedure between the different IACs may include the steps described as follows.

Step 601 is identical with the step 501.

In step 602, a shared virtual MAC address is configure for IAC21, IAC22 and IAC23, which are backup IACs of each other.

For example, IAC 21, IAC22 and IAC23 may share a same virtual MAC address '00.00.00.00.00.01'.

Steps 603-607 are identical with the steps 503-507.

In step 608, after IAC22 becomes the new master IAC, IAC22 initiates a free ARP message with the virtual IP address '10.1.1.3'. The free ARP message announces that the MAC address associated with the virtual IP address '10.1.1.3' shall be the virtual MAC address of IAC22, i.e., '00.00.00.00.00.01'.

In step 609, after receiving the free ARP message initiated by IAC22, the NFC updates routing information.

To be specific, the free ARP message issued by IAC22 announces that the MAC address associated with the IP address '10.1.1.3' shall be the virtual MAC address of IAC22, i.e., '00.00.00.00.00.01', since the MAC address associated with the IP address 10.1.1.3 in the ARP table entry learnt previously by the NFC is '00.00.00.00.00.01', the NFC need not update the entry.

In addition, since the free ARP message sent by the new master IAC, i.e., IAC22, reaches the NFC via an NFC side internal data interface connected to the new master IAC, e.g., data interface 2, the NFC thereby obtains a relation between the MAC address '00.00.00.00.00.01' and the internal data interface 2. The NFC replaces the MAC entry which stores the relation between the MAC address '00.00.00.00.00.01' and the data interface 1 with an entry storing the relation between the MAC address '00.00.00.00.00.01' and the internal data interface 2.

After that, each time when the NFC receives a message from an external device with '10.1.1.3' as the destination IP address, the NFC searches the ARP table entry and the MAC table entry and finds the data interface 2, and forwards the message via the data interface 2 to the master IAC, i.e., IAC22, whose virtual MAC address is '00.00.00.00.00.01'.

Figure 7:
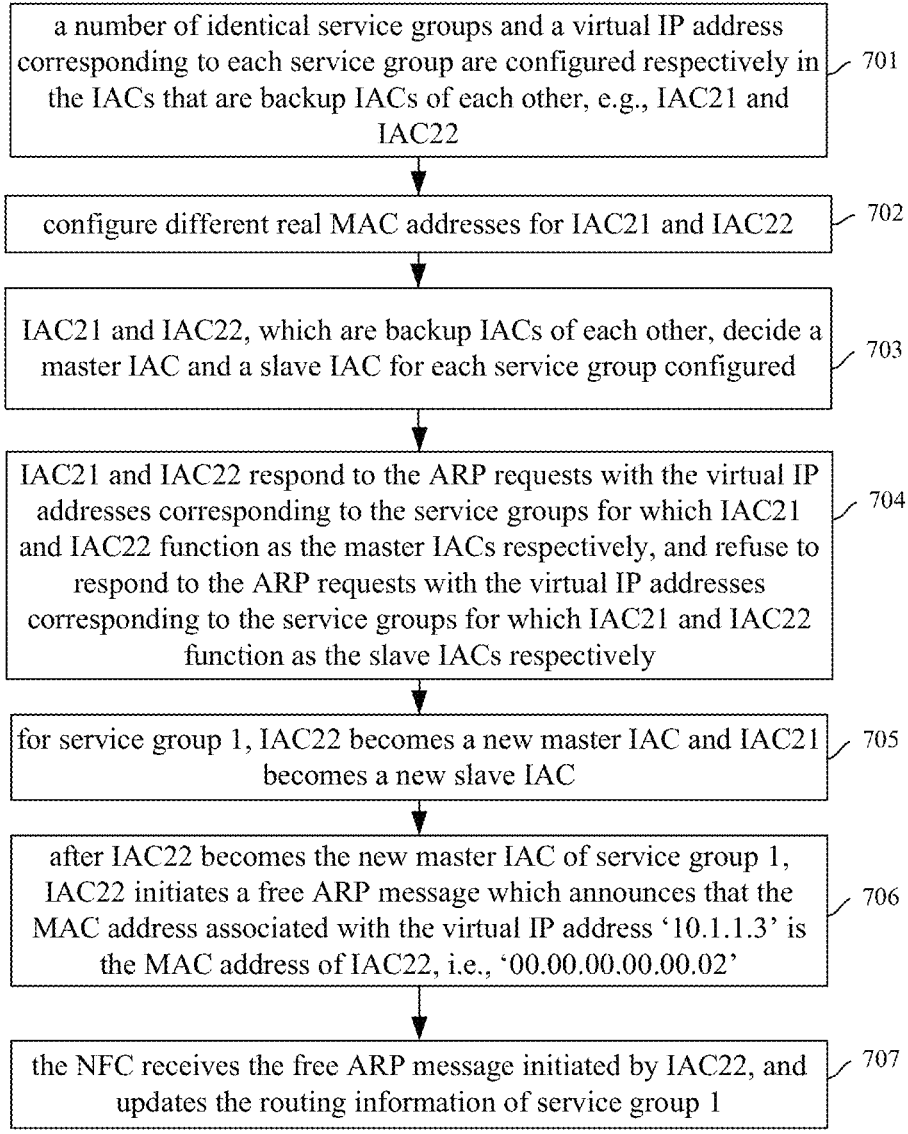
FIG. 7 is a flowchart of a master/slave backup procedure between different IACs in accordance with an embodiment of the present invention.

FIG. 7 is a flowchart of a master/slave backup procedure between different IACs in accordance with a third embodiment of the present invention. As shown in FIG. 7, in accordance with the present embodiment, different IACs that are backup IACs of each other possess a shared virtual IP address and different MAC addresses, and the IACs also share workload based on different service groups. When the NFC and the IAC are communicating in the host mode, the master/slave backup procedure between the IACs may include the steps described as follows.

In step 701, a number of identical service groups and a virtual IP address corresponding to each service group are configured respectively in the IACs that are backup IACs of each other, e.g., IAC21 and IAC22.

For implementing master/slave backup based on load sharing, multiple service groups which require load sharing are configured in each of the IACs, and a virtual IP address for each service group is also configured in each of the IACs. For example, when two service groups requiring load sharing, e.g., service group 1 and service group 2, are configured in IAC21 and IAC22, the virtual IP address for the service group 1 is set to be '10.1.1.3' and the virtual IP address for the service group 2 is set to be '10.1.1.4'. It should be noted that the number of service groups requiring load sharing and the number the virtual IP addresses for the service groups are not limited to 2, and this embodiment only serves as an illustrative example.

As far as one service group is concerned, IAC21 and IAC22 have a same virtual IP address for the same service group, and the virtual IP address for the service group is used in all service settings related to the service group. To be particular, the virtual IP address '10.1.1.3' is used in all service settings related to the service group 1, and the virtual IP address '10.1.1.4' is used in all service settings related to the service group 2.

In step 702, different real MAC addresses are configured for IAC21 and IAC22.

For example, the real MAC address of IAC21 is set to be '00.00.00.00.00.01' and the real MAC address of IAC22 is set to be '00.00.00.00.00.02'.

In step 703, IAC21 and IAC22 decide a master IAC and a slave IAC for each service group configured.

The step can be performed following any of the methods below.

Method A: configuring a master IAC and a slave IAC in IAC21 and IAC22 in advance for each of the service groups configured according to a load sharing principle. In this way, IAC21 and IAC22 can determine which of IAC21 and IAC22 is to be the master IAC and which of IAC21 and IAC22 is to be the slave IAC for each service group according to the settings.

According to the load sharing principle, IAC21 is set to be the master IAC of service group 1 with IAC22 being the backup IAC for service group 1, and the IAC22 is set to be the master IAC of service group 2 with IAC21 being the backup IAC for service group 2.

Method B: for each service group, setting priority levels of IAC21 and IAC22 respectively in advance, and IAC21 and IAC22 decide a master IAC and a slave IAC for the service group through contention. The detailed process of this method is explained hereinafter.

For a service group, e.g., service group 1, the master IAC of service group 1 sends basic information messages to the slave IAC periodically. A basic information message at least includes the priority level of the master IAC for this service group.

Each IAC starts up as a slave IAC, then listens and checks whether there is an IAC working in master mode for service group 1. An IAC may face either of the following two situations upon startup: one situation is that no IAC is working in master mode for the service group 1, i.e., no master IAC currently exists; the other situation is that an IAC is working in master mode for service group 1, i.e., a master IAC currently exists. The first situation usually occurs when IACs that are backup IACs of each other have just started up, i.e., the IACs start up at almost the same time when the NFC starts up and none of the IACs is working in master mode for service group 1. The latter situation usually occurs when an IAC restarts after recovering from malfunction and another IAC which is a backup IAC of the restarted IAC is working in master mode for service group 1, i.e., a master IAC exists. It should be noted that the number of the IACs that are backup IACs of each other can be lager than two, hence in the latter situation, the OAA system may have a master IAC as well as other slave IACs.

When receiving a basic information message from a master IAC of service group 1, a slave IAC of service group 1 compares the priority level of the slave IAC and the priority level of the master IAC. When the priority level of the slave IAC is higher than that of the master IAC, the slave IAC will become a new master IAC of service group 1 and the master IAC that issues the current basic information message will become a new slave IAC of service group 1. When the priority level of the slave IAC is lower than that of the master IAC, the slave IAC will remain a slave IAC. Furthermore, when the priority levels of the slave IAC and the master IAC are identical, the IP addresses of the IACs will be compared and the IAC with a smaller IP address will be the master IAC of service group 1.

When the slave IAC of service group 1 does not receive any basic information message from the master IAC in a pre-determined period of time, the slave IAC will become a new master IAC of service group 1. The pre-determined period of time is set by a user based on practical needs and is usually longer than the interval between two successive issuances of basic information messages by the master IAC of service group 1. Usually the reason for not receiving any basic information message by the slave IAC over the pre-determined period of time is that the master IAC malfunctions and has stopped working.

It should be noted that the Method A is applicable upon the startup of IAC21 and IAC22 which are backup IACs of each other with shared workload, and the Method B is applicable upon the startup of IAC21 and IAC22 which are backup IACs of each other with shard workload as well as during the real-time communication between the IACs and the NFC after the IACs starts up and the master IAC malfunctions or when the service requires a new master IAC.

In step 704, IAC21 and IAC22 respond to the ARP requests with the virtual IP addresses corresponding to the service groups for which IAC21 and IAC22 function as the master IACs respectively, and refuse to respond to the ARP requests with the virtual IP addresses corresponding to the service groups for which IAC21 and IAC22 function as the slave IACs respectively.

Functioning as a master IAC for a service group includes processing the services in the service group, such as receiving traffics related to the service group from the NFC. Functioning as a slave IAC for a service group means that the IAC processes none of the services in the service group, such as not receiving the traffics related to the service group from the NFC.

When receiving a message with '10.1.1.3' as the destination IP address for the first time, the NFC broadcasts an ARP request to the IP address '10.1.1.3' since the NFC has not studied ARP-related information. Both IAC21 and IAC22 receive the ARP request and the virtual IP addresses of both the IACs include '10.1.1.3'. IAC21 finds that the service group corresponding to the virtual IP address '10.1.1.3' is service group 1 for which IAC21 is the master IAC, hence IAC21 responds to the ARP request and informs the NFC of the IP address and the MAC address of IAC21, i.e., '10.1.1.3' and '00.00.00.00.00.01'. IAC22 finds that the service group corresponding to the virtual IP address '10.1.1.3' is service group 1 for which IAC22 is the slave IAC, hence IAC2 does not respond to the request and discard the request directly.

From the ARP response returned by IAC21, the NFC obtains a relation between the virtual IP address '10.1.1.3' corresponding to service group 1 and the MAC address '00.00.00.00.00.01' of the master IAC of service group 1, and the NFC stores the relation in an ARP table entry. At the same time, since the ARP response from IAC21 reaches the NFC via data interface 1, the NFC also obtains a relation between the MAC address '00.00.00.00.00.01' of the master IAC of service group 1 and the internal data interface 1 of the NFC, and the NFC stores the relation in a MAC table entry. After that, the NFC can always forwards incoming messages with '10.1.1.3' as the destination IP address to the master IAC of service group 1, i.e., IAC21, whose MAC address is '00.00.00.00.00.01', via data interface 1.

Likewise, when the NFC receives a message with '10.1.1.4' as the destination IP address for the first time and broadcasts an ARP request with the IP address, only IAC22 responds to the request. From the ARP response returned by IAC22, the NFC obtains the relation between the virtual IP address '10.1.1.4' corresponding to service group 2 and the MAC address '00.00.00.00.00.02' of the master IAC of service group 2, and the NFC stores the relation in an ARP table entry. Meanwhile, since the ARP response from IAC22 reaches the NFC via internal data interface 2 of the NFC, the NFC also obtains a relation between the MAC address '00.00.00.00.00.02' of the master IAC of service group 2 and the data interface 2, and the NFC stores the relation in a MAC table entry. After that, the NFC can always forwards incoming messages with '10.1.1.4' as the destination IP address to the master IAC of service group 2, i.e., IAC22, whose MAC address is '00.00.00.00.00.02' via data interface 2.

For the purpose of being concise, the master/backup switching procedure is explained hereinafter through steps 705 to 707 in FIG. 7 with reference to the master/slave switching of service group 1 only.

In step 705, when detecting a need of switching the master IAC and the slave IAC of service group 1, IAC22 becomes a new master IAC of service group 1 and IAC21 becomes a new slave IAC.

In the step 703 above, when the current master IAC of service group 1 is decided, the master IAC of service group 1, i.e., IAC21, issues basic information messages periodically to the slave IAC of service group 1. The basic information messages may carry the IP address and priority level information of the master IAC. Thus in step 705, the procedure of detecting a need of switching the master IAC and the slave IAC may further include the following steps.

For service group 1, when multiple slave IACs exist and the slave IACs do not receive the basic information messages from IAC21 within a pre-determined period of time, the slave IACs all switch to the master IAC mode, then an actual master IAC will be decided based on the priority levels and/or the IP addresses of the IACs. Or, when only one slave IAC, i.e., IAC22, exists for service group 1, the slave IAC will switch to the master IAC mode and functions as a master IAC directly.

Or, in service group 1, when multiple slave IACs exist and the slave IACs receive the basic information messages within the pre-determined period of time from the master IAC21, but the slave IACs detect that a master/slave switching is needed based on the priority levels and/or the IP addresses of the master IAC and the slave IACs, for example, the priority level of the master IAC, i.e., IAC21, is 2 and the priority level of the slave IAC22 is 1, which indicates that the priority level of IAC22 is higher than that of IAC21, the slave IAC22 will become the new master IAC. Or, when only one slave IAC, i.e., IAC22, exists for service group 1, the slave IAC will switch to the master IAC mode and function as the master IAC directly.

Therefore it can be seen that, in this step, the master/slave switching may result from the malfunction of the previous master IAC, or from a change in the priority levels or IP addresses of the IACs.

It should also be noted that the master/slave election among the IACs which are backup IACs of each other for service group 1 may be implemented in various ways. For example, the IACs may all start up as master IACs, the election policy is not limited to basing on the priority levels and the IP addresses, the user may customize the election policy according to the needs.

In step 706, after IAC22 becomes the new master IAC of service group 1, IAC22 initiates a free ARP message carrying the virtual IP address '10.1.1.3' corresponding to service group 1. The free ARP message announces that the MAC address associated with the virtual IP address '10.1.1.3' shall be the MAC address of IAC22, i.e., '00.00.00.00.00.02'.

It is explained in the preceding description that, when IAC21 is the master IAC of service group 1, the MAC address associated with the IP address '10.1.1.3' in the ARP table entry studied by the NFC is the MAC address of IAC21, i.e., '00.00.00.00.00.01'. After the master/slave switching, the NFC may update the entry only when receiving the ARP message sent by the new master IAC, i.e., IAC22.

In step 707, after receiving the free ARP message initiated by IAC22, the NFC updates the routing information of service group 1.

The details of this step are identical with the details of step 509, and the relations updated in the step are all related to service group 1, hence the routing information of service group 1 in the NFC is updated after the master/slave switching in service group 1, so that the messages of service group 1 can be correctly forwarded to the master IAC of service group 1 after the switching.

The master/slave switching procedure for service group 2, which may result from the malfunction of IAC22 or other reasons, is similar to the procedure described through the step 705 to step 707.

Figure 8:
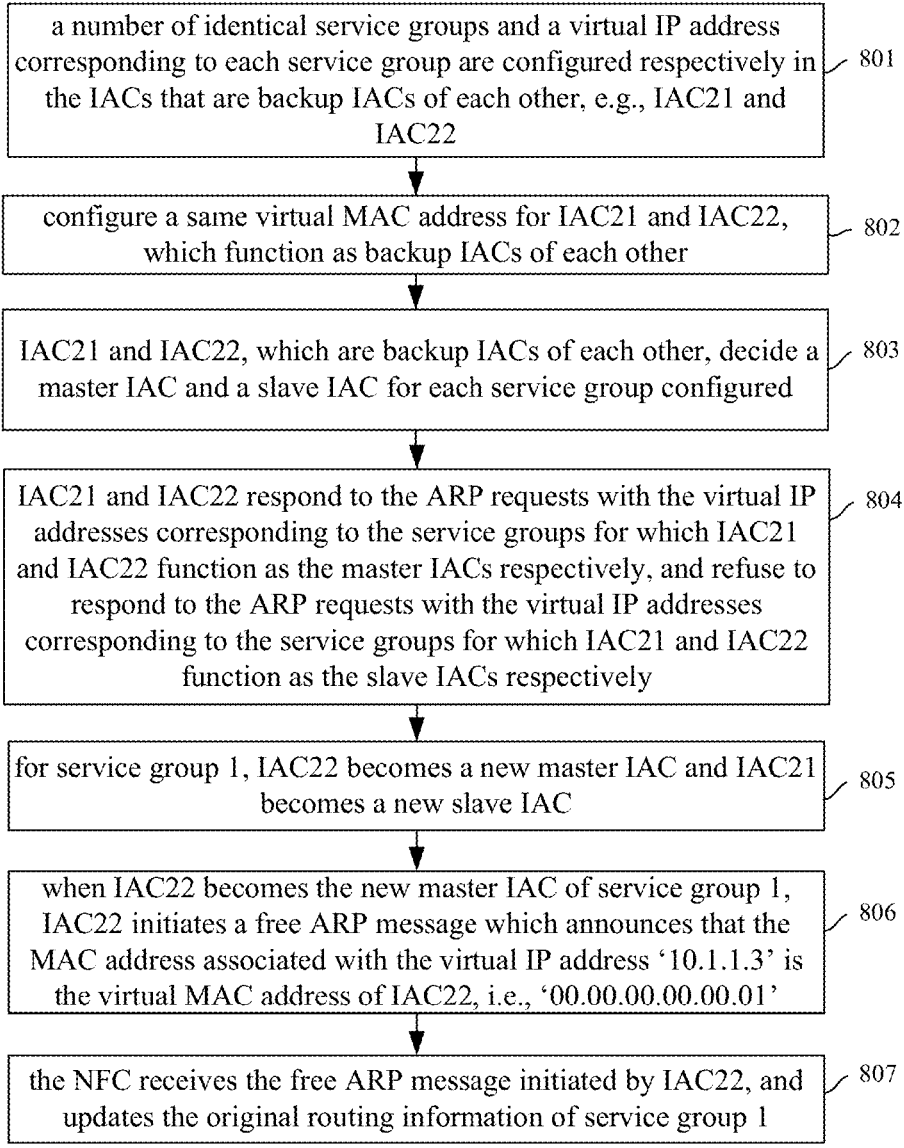
FIG. 8 is a flowchart of a master/slave backup procedure between different IACs in accordance with an embodiment of the present invention.

FIG. 8 is a flowchart of a master/slave backup procedure between different IACs in accordance with a fourth embodiment of the present invention. As shown in FIG. 8, different IACs that are backup IACs of each other in accordance with the present embodiment share a same virtual IP address and a same virtual MAC address. The IACs also share workload based on service groups. When the NFC and the IACs are communicating in the host mode, the master/slave backup procedure between the IACs may include the steps described as follows.

Step 801 is identical with Step 701.

In step 802, configure a same virtual MAC address for IAC21 and IAC22, which function as backup IACs of each other.

For example, the virtual MAC address of IAC21 and IAC22 can be set to be '00.00.00.00.00.01'.

Steps 803-805 are identical with the steps 703-705.

In step 806, after IAC22 becomes the new master IAC of service group 1, IAC22 initiates a free ARP message with the virtual IP address '10.1.1.3', The free ARP message announces that the MAC address associated with the virtual IP address '10.1.1.3' shall be the virtual MAC address of IAC22, i.e., '00.00.00.00.00.01'.

In step 807, after receiving the free ARP message initiated by IAC22, the NFC updates the original routing information of service group 1.

The details of this step are identical with the details of step 609, but the relations updated in this step are all related to service group 1, hence the routing information of service group 1 in the NFC is updated after the master/slave switching for service group 1, so that the messages of service group 1 can be correctly forwarded to the new master IAC of service group 1 after the switching.

It should be noted that the steps 501-502, 601-602, 701-702 and 801-802 can be implemented by setting the cooperation mode-related configuration information as in the above second step.

It can be seen from the workflows in FIGS. 6 and 8 that, in the master/slave backup procedure between different IACs, the contents of the free ARP message initiated by the new master IAC are identical with the contents of the ARP message sent to the NFC by the previous master IAC, i.e., the ARP message always carries the relation between the shared virtual IP address and the shared virtual MAC address. Therefore network devices other than the NFC in the network will not be affected even after studying the free ARP message.

It should also be noted that in the flows shown in FIGS. 5, 6, 7 and 8, the information recorded in the MAC table entry which corresponds to the data interface corresponding to the MAC address of the master IAC may include any type of information as long as the information can be used for identifying the data interface, e.g., the MAC address or the name of the data interface and so on.

Secondly, the communication procedure in the mirror mode is explained.

When the cooperation mode set for an NFC and an IAC includes the mirror mode, the communication procedure between the NFC and the IAC may include the steps as follows. The NFC acquires a condition of acquiring messages of the IAC. After receiving a message from an external device, the NFC judges whether the message is to be acquired based on the condition of acquiring messages. If determining the message is to be acquired, the NFC sends the message to the IAC and at the same time forwards the message; if determining the message is not to be acquired, the NFC forwards the message directly.

Thirdly, the communication procedure in the redirection mode is explained.

When the cooperation mode set for an NFC and an IAC includes the redirection mode, the communication procedure between the NFC and the IAC may include the steps as follows. The NFC acquires a condition of acquiring messages of the IAC. After receiving a message from an external device, the NFC judges whether the message is to be intercepted based on the condition acquiring messages. If determining the message is not to be acquired, the NFC forwards the message directly; if determining the message is to be acquired, the NFC replaces the destination IP address and the MAC address of the to-be-redirected message with the IP address and MAC address of the IAC when the NFC is a Layer-3 device forwarding messages based on IP addresses; or, the NFC replaces the destination MAC address of the to-be-redirected message with the MAC address of corresponding IAC when the NFC is a Layer-2 device forwarding messages based on MAC addresses.

In the mirror mode and the redirection mode, the method of obtaining the condition of acquiring messages by the NFC may include, but not limited to, either of the following two methods.

One of the methods is Method 11. According to the Method 11, in the setting procedure of the above second step, the cooperation mode-related configuration information of the NFC and the IAC further includes the condition of acquiring messages of the IAC, hence the NFC and the IAC may acquire the condition of acquiring messages from the cooperation mode-related configuration information of the NFC and the IAC.

The other of the methods is Method 22. According to the Method 22, the IAC sends a pre-determined condition of acquiring messages to the NFC, and the NFC obtains the condition of acquiring messages by receiving that from the IAC.

In the above Method 22, the condition of acquiring messages may include: an acquiring rule including characteristic information of the messages to be acquired, or an association strategy including network topology information, or both the acquiring rule including characteristic information of messages to be acquired and the association strategy including network topology information. No matter what the condition of acquiring messages is, the condition of acquiring messages always includes the information of a destination interface to which a message is to be sent by mirroring or be redirected, i.e., the information of the NFC side data interface connected to the IAC to which the message is to be sent.

Figure 9:
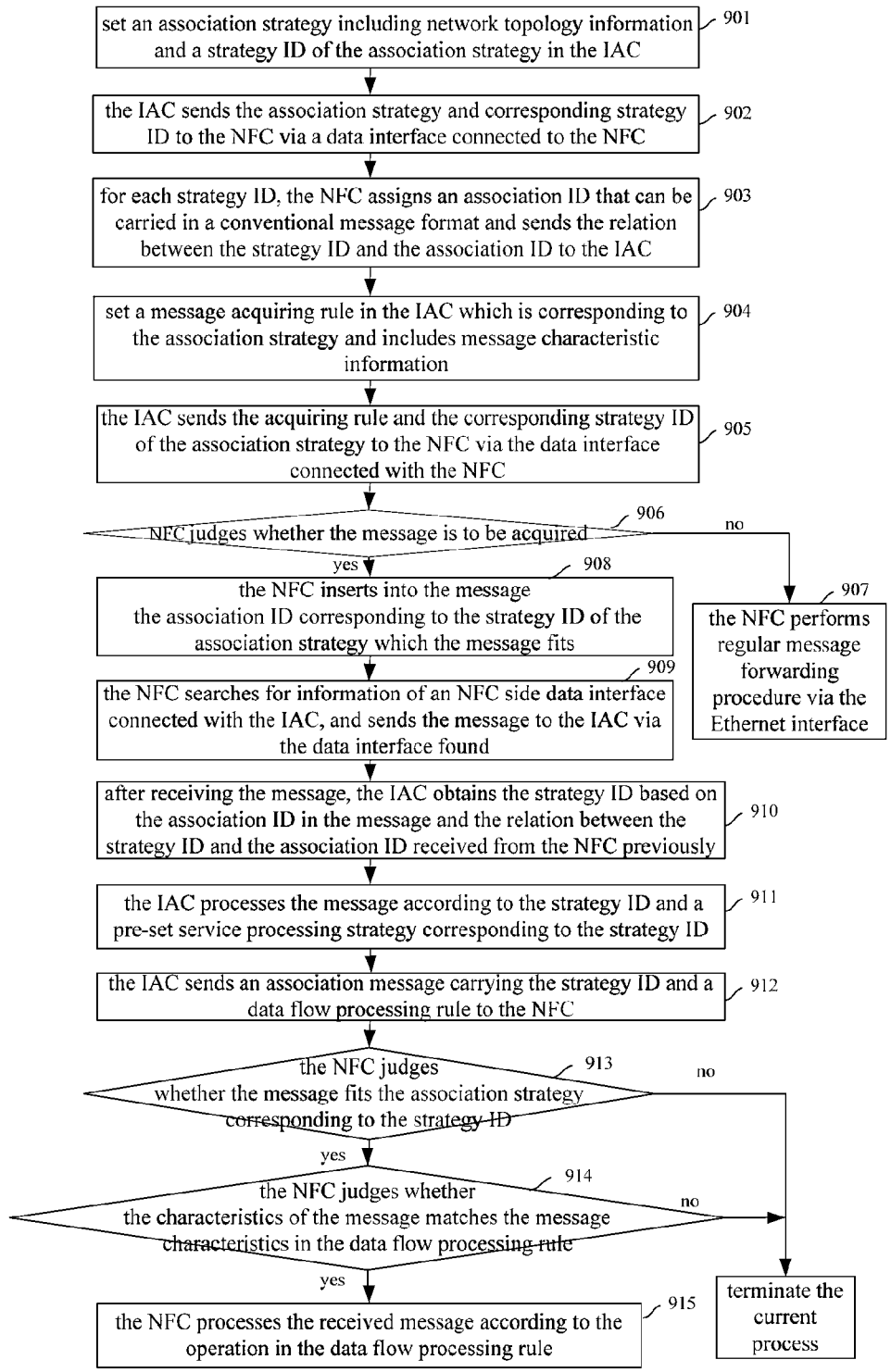
FIG. 9 is a flowchart of setting a message acquiring condition in an NFC by an IAC and acquiring a message by the NFC in accordance with an embodiment of the present invention.

FIG. 9 is a flowchart of setting a condition of acquiring messages in an NFC by an IAC and acquiring a message by the NFC in accordance with an embodiment of the present invention. As shown in FIG. 9 and based on Method 22, the condition of acquiring messages includes an acquiring rule including characteristic information of messages to be acquired and an association strategy including network topology information. Method 22 is explained in detail as follows.

In step 901, set an association strategy including network topology information and a strategy ID of the association strategy in the IAC.

The association strategy includes original network topology information of a message passing through the NFC. The network topology information is information of a path which is independent of the characteristics of the message (e.g., the 7-tuple of the message), including any one or any combination of original ingress interface information, original egress interface information, VLAN information of an original ingress interface, VLAN information of an original egress interface and redirection destination interface information. The strategy ID is the unique identity of the association strategy with which the NFC and the IAC may identify the object of an operation. The original ingress interface and the original egress interface are the ingress and egress interfaces of the NFC, and when a data flow is not redirected, the data flow will pass through the NFC via these interfaces. The redirection destination interface is the destination interface to which the data flow is redirected or mirrored, i.e., the interface that connects the NFC and the IAC. The original network topology information in the association strategy may include any information as long as the information is independent of the characteristics of a specific message and can be used for identifying the data flow.

Preferably, an association strategy may include the following items: (1) strategy ID; (2) original ingress interface; (3) original egress interface; (4) destination interface for redirection or mirroring.

The IAC may send one or multiple association strategies to the NFC and each of the association strategies has a unique strategy ID.

In step 902, the IAC sends the association strategy and corresponding strategy ID to the NFC via the data interface which connects the NFC and the IAC.

In step 903, for each strategy ID, the NFC assigns an association ID that can be carried in a conventional message format and sends the relation between the strategy ID and the association ID to the IAC.

Because the strategy ID is assigned by the IAC, the strategy ID may not be suitable for being carried in a conventional message format, e.g., unless the conventional message format is modified. For this reason, the NFC assigns an association ID to each strategy ID according to the software and hardware architecture of the NFC, and informs the IAC of the relation between the strategy ID and the association ID so that the IAC may obtain the strategy ID based on the association ID.

In this step, a VLAN label or the stack header of an ASIC chip in the NFC may be used as an association ID. Conventional message formats all include a VLAN label field or a stack header field. Therefore, the NFC assigns a reserved VLAN label or a reserved stack header for the strategy ID as the association ID corresponding to the strategy ID.

In step 904, set a rule of acquiring messages in the IAC. The rule of acquiring messages is corresponding to the association strategy and includes message characteristic information.

To be specific, the rule of acquiring messages includes message characteristic information and an acquiring operation. Preferably, the message characteristic information includes information carried in the message for identifying the message, such as any one or any combination of: the MAC of source, the MAC of destination, VLAN range, priority of 802.1q, source IP address+mask, destination IP address+mask, IP protocol number, source port range, destination port range, IP priority and IP fragment mark. The acquiring operation includes but not limited to redirecting or mirroring, i.e., information instructing the NFC to provide data flow for the IAC.

In step 905, the IAC sends the rule of acquiring messages and the strategy ID of the association strategy corresponding to the rule of acquiring messages to the NFC via the data interface connected with the NFC.

Since the NFC has already obtained the association strategy and the strategy ID in step 903, in this step the NFC obtains the association strategy corresponding to the rule of acquiring messages when the NFC receives the strategy ID corresponding to the rule of acquiring messages. Furthermore, because the association strategy includes the original network topology information of the messages passing through the NFC, the NFC becomes aware of what kind of network topology information the messages satisfying the rule of acquiring messages may have.

In step 906, after receiving a message from an external device, the NFC judges whether the message is to be acquired according to the rule of acquiring messages and corresponding association strategy. If determining the message is not to be acquired, step 907 will be performed; if the message is to be acquired, step 908 will be performed.

The judging procedure may include steps as follows. The NFC judges whether the network topology information carried in the message received is identical with the network topology information in the association strategy. If the network topology information is not identical, the message is not to be acquired and the NFC performs step 907; if the network topology information is identical, the NFC searches for the rule of acquiring messages which has the same strategy ID with the association strategy, i.e., searching for the rule of acquiring messages to which the association strategy is corresponding, and further judges whether the characteristic information of the message received is identical with the message characteristic information in the rule of acquiring messages. If the message characteristic information is identical, the message is to be acquired and the NFC performs step 908, otherwise the message is not to be acquired and the NFC performs step 907.

In step 907, the NFC performs normal procedure of forwarding messages and ends this process.

In step 908, the NFC obtains the association ID corresponding to the strategy ID of the association strategy which the message satisfies, and inserts the association ID into the message.

In step 909, the NFC searches for information of an NFC side data interface connected with the IAC, and sends the message to the IAC via the data interface found.

In step 910, after receiving the message, the IAC obtains the strategy ID based on the association ID in the message and the relation between the strategy ID and the association ID received from the NFC previously.

Since the IAC can obtain the association strategy to which the message is corresponding, i.e., the original network topology information of the message from the NFC, such as the source ingress interface and egress interface of the message past through the NFC, the VLAN in which the source ingress interface resides and the VLAN in which the source egress interface resides, the IAC is capable of identifying different data flows and further generating service analysis statistics for specified data flows.

In step 911, the IAC processes the message according to the strategy ID and a pre-set service processing strategy corresponding to the strategy ID.

In the steps 908 to 911, the strategy ID inserted into the message enables the IAC to decide a service processing strategy corresponding to the message and completes the processing. However, in practical applications, the strategy ID is not necessarily adopted, in which case, the steps 908 to 911 may be replaced with the following steps. The NFC inserts the condition of acquiring messages, which the message fits and which includes the association strategy and the rule of acquiring messages, into the message. The NFC searches for information of the NFC side data interface connected to the IAC, and sends the message to the IAC via the data interface found. After receiving the message, the IAC processes the message according to the association strategy and the rule of acquiring messages carried in the message and a corresponding preset service processing strategy.

In step 912, the IAC sends an association message carrying the strategy ID and a rule of data flow processing to the NFC.

The rule of data flow processing usually includes specific message characteristics and the operation(s) that the NFC is expected to perform.

In step 913, after receiving a message, the NFC judges whether the message fits the association strategy corresponding to the strategy ID in the association message. If the message fits the association strategy, step 914 will be performed, otherwise the present process will be terminated.

In step 914, the NFC judges whether the characteristics of the message match the message characteristics in the rule of data flow processing. If the message characteristics match, step 915 will be performed, otherwise the present process will be terminated.

The judging process may include: judging by the NFC whether the characteristics of the message received are identical with the message characteristics in the rule of data flow processing, if the characteristics are identical with the message characteristics in the rule of data flow processing, determining the message fits the rule of data flow processing, otherwise determining the message does not fit the rule of data flow processing.

In step 915, the NFC processes the received message according to the operation in the rule of data flow processing.

The procedure of judging whether the message fits the association strategy in step 913 is identical with the procedure of judging whether the message fits the association strategy in step 906.

In steps 912 and 914, the IAC, according to the analysis and processing result of the message, triggers the NFC to process the specific message by sending the rule of data flow processing to the NFC. For example, when the message characteristics in the rule of data flow processing describe the characteristics of an attacking message, the NFC may perform corresponding operation, such as "reject", to the message acquired; or, when the message characteristics in the rule of data flow processing describe the characteristics of an ordinary valid message, the NFC may perform corresponding operation, such as "allow" or "limit", to the message acquired. It should be noted that the operations to be performed are not limited to "reject", "allow" and "limit". Furthermore, the IAC may directly recognize and delete an attacking message. Similar to the procedure in which the NFC functions according to the acquiring rule, the NFC need not process all messages according to a specific rule of data flow processing, but only the messages that include the network topology information as that included in the association strategy. To be specific, the NFC matches the messages which satisfy the association strategy with a rule of data flow processing specified to find appropriate messages that match the rule of data flow processing, and processes the messages according to the operation defined in the rule of data flow processing, such as "reject", "allow" or "limit the data rate of" the messages.

It can be seen that, by associating the rule of data flow processing with the association strategy, the number of messages for which the NFC needs to perform matching according to the rule of data flow processing is remarkably reduced, e.g., the NFC only needs to match messages received through a specific Ethernet interface, or messages with a specific Ethernet interface as the source egress interface. The procedure is similar to the procedure that the NFC processes messages according to the acquiring rule.

It should also be noted that in the process shown in FIG. 9, the combination of any two or three of the association strategy, the acquiring rule and the rule of data flow processing of the IAC can be carried in one association message and sent to the NFC so that the number of times of the communication between the NFC and the IAC is reduced and the workloads of the NFC and the IAC are reduced.

In the process shown in FIG. 9, the NFC assigns an association ID for the strategy ID set by the IAC, informs the IAC of the relation between the association ID and the strategy ID, and further inserts the association ID into a message fitting the acquiring rule to inform the IAC of the association strategy applicable to the message. Conventional format of the message is able to carry the association ID, hence the message format barely needs modification and is easy to be implemented. Obviously, in practice, the NFC may modify the message fitting the acquiring rule instead of going through the procedure related to the association ID, e.g., the NFC may add a new field into the message and insert the strategy ID into the modified message directly. To sum up, as long as the NFC specifies the association strategy in a message which fits the acquiring rule corresponding to the association strategy, the IAC will be able to identify different data flows and obtains the original network topology information of the data flows passing through the NFC. In the same way, the NFC may recover the original network topology information of the message returned by the IAC. When the message directly carries the strategy ID set by the IAC, or when the message carries the association ID assigned by the NFC, different ways may be adopted to carry the information, such as adding a dedicated field in the conventional message format, or utilizing an existing field in the conventional message format, such as the VLAN label field.

For example, the strategy ID of an association strategy is 10, and based on resource consumption situations, the NFC assigns VLAN20 as the association ID for the strategy ID 10. Usually the NFC uses information currently not in use as the association ID, e.g., when the NFC finds that the VLAN labels 15 to 20 are not in use, the NFC will use the VLAN labels 15 to 20 as association IDs indicating corresponding strategy IDs. In this example, the NFC utilizes the VLAN label field in the message to carry the association ID 20. When receiving a message with the value 20 in the VLAN label field, the IAC recognizes that the strategy ID corresponding to the message is 10.

It can also be seen in the flow shown in FIG. 9 that the condition of acquiring messages includes the association strategy and the acquiring rule, therefore the NFC need not search in all messages for data flows fitting the acquiring rule, but only in messages matching the network topology information included in the association strategy. For example, the IAC sends an acquiring rule and corresponding strategy ID 2 to the NFC, and the network topology information included in the association strategy with the strategy ID 2 includes: Ethernet interface 2 as the source ingress interface, hence the NFC only needs to search the messages received from the Ethernet interface 2 instead of messages from all Ethernet interfaces for messages matching the acquiring rule. In this way, the efficiency of the NFC in the rule matching procedure can be improved greatly.

Obviously, the rule of acquiring messages may include the association strategy only, and in which case the steps 904 and 905 in the process shown in FIG. 9 shall be canceled and step 906 shall be modified into the following procedure: the NFC judges whether the network topology information of a message received is identical with the network topology information in the association strategy, if the network topology information is identical, the NFC determines that the message is to be acquired, i.e., performs step 908; if the network topology information is not identical, the NFC determines that the message is not to be acquired, i.e., performs step 907.

In addition, the condition of acquiring messages may include the acquiring rule only, in which case the steps 901 to 906 in the process shown in FIG. 9 shall be modified into the following steps. Set an acquiring rule including message characteristic information and corresponding strategy ID in the IAC. The IAC sends the acquiring rule and the corresponding strategy ID to the NFC via a data interface connected to the NFC. For each strategy ID, the NFC assigns an association ID which can be carried in a message of a conventional message format and informs the IAC of the relation between the strategy ID and the association ID. The NFC judges whether the message characteristic information in the acquiring rule are identical with the message characteristic information carried in the message received, if the message characteristic information is identical, determines that the message is to be acquired, i.e., performs step 908; if the message characteristic information is not identical, determines that the message is not to be acquired, i.e., performs step 907.

When the NFC and the IAC are communicating in the mirror mode, after receiving a message from an external device, as shown in FIG. 9, besides judging whether the message is to be acquired, the NFC needs to forward the message according to the normal forwarding procedure. When the NFC and the IAC are working in the redirection mode, as shown in FIG. 9 after step 911, if the IAC decides to return the message after processing the message, the IAC will send the processed message to the NFC to be forwarded by the NFC.

In the process shown in FIG. 9, the communication protocol between the NFC and the IAC may be Simple Network Management Protocol (SNMP) or a customized private communication protocol. The SNMP protocol defines 5 types of messages: (1) get-request, for getting the value of one or multiple parameters from an agent process; (2) get-next-request, for getting the value of a parameter following the one or more parameters from an agent process; (3) set-request, for setting the value of one or multiple parameters in the agent process; (4) get-response, for returning the value of one or multiple parameters from the agent process in response to a message of type (3); (5) trap, a message initiated by an agent process for informing an administrative process of an event occurred.

Referring to the process shown in FIG. 9, the IAC may use a set-request message for sending the association strategy or the acquiring rule to the NFC, and use a get-request message for getting the association ID from the NFC. Accordingly, the NFC may use a get-response message for returning the strategy ID and the association ID to the IAC.

It can be seen from the communication procedure between the NFC and the IAC under the redirection mode that, before sending the message fitting the condition of acquiring messages to the IAC, the NFC may replace the source address information in the message with the information of an NFC side data interface connected to the IAC, and replace the destination address information in the message with the information of an IAC side data interface, which means the source address and the destination address in the message sent by the NFC to the IAC are different from the source address and the destination address in the original message. Hence the processed message returned by the IAC to the NFC also carries a source address and a destination address totally different from those in the original message. However, after receiving the message from the IAC, the NFC generally needs the source address and/or the destination address of the original message for further processing, so the NFC needs to be able to recover the original source address and/or the original destination address of the message returned from the IAC for further processing.

Based on characteristics of the structure of the original message received from an external device and the characteristics of the redirection procedure, the NFC may adopt either of the following two methods to recover the information in the message returned by the IAC.

One is Method 30, in which the NFC stores the characteristic information of the original message and recovers the message returned from the IAC by using the stored characteristic information;

The other is Method 31, in which the NFC recovers the message returned from the IAC by using the condition of acquiring messages in the redirection mode.

Each of the two methods for recovering the message is explained respectively hereinafter with reference to an embodiment thereof.

Figure 10:
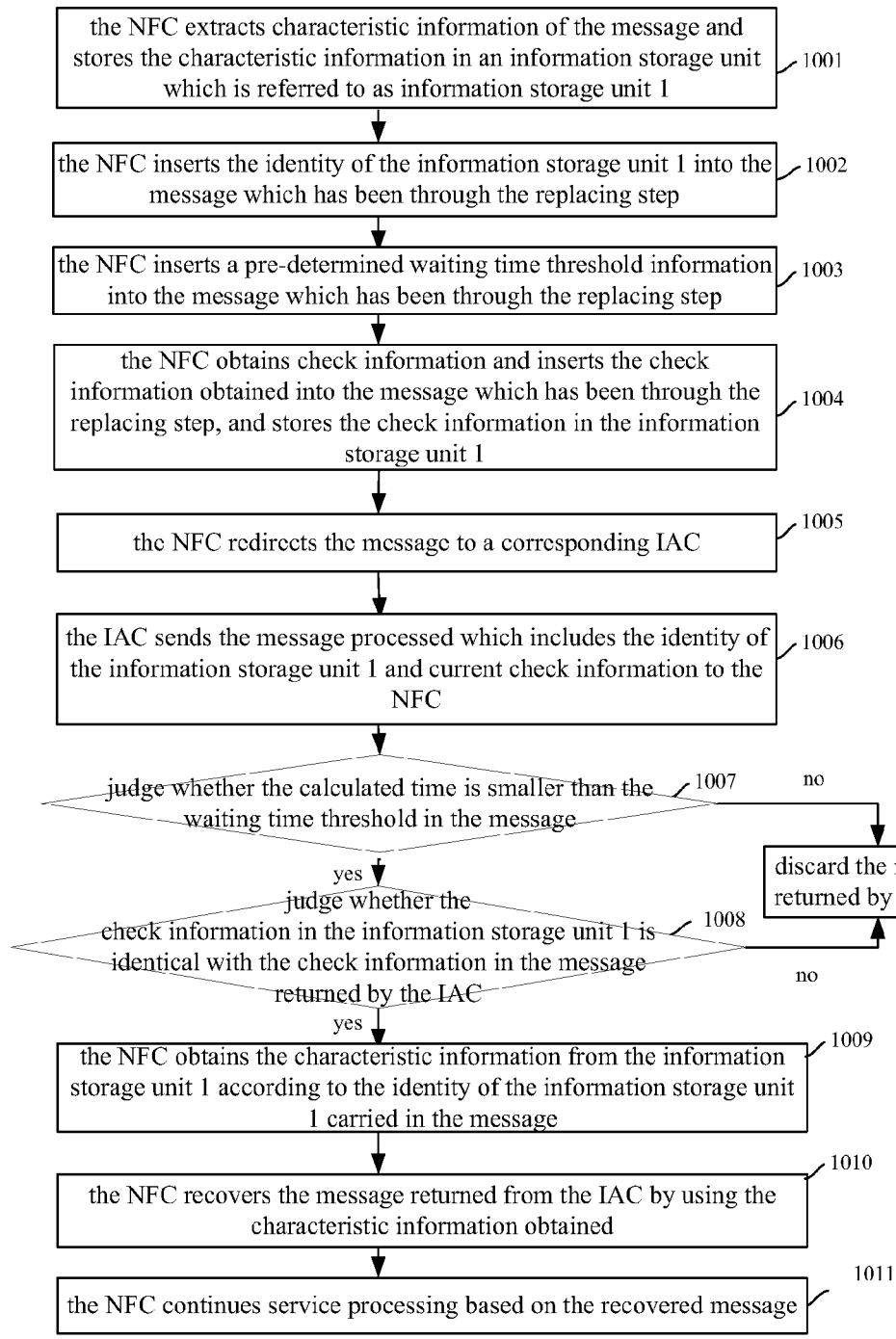
FIG. 10 is a flowchart of recovering a message returned from an IAC by using message characteristic information stored by an NFC in accordance with an embodiment of the present invention.

According to Method 30, a message in network communication shall carry characteristic information for distinguishing different messages. The most frequently used message characteristic information includes a source address and a destination address of the message. In addition, when entering an NFC, a message is usually processed on different layers of the software system of the NFC, e.g., the data link layer and the network layer. In order to prevent data loss during the process, data structure of a message usually includes two parts: a payload field which stores the actual contents of the message and an auxiliary information field which stores auxiliary information of the message for facilitating message transmission between different layers and modules. The auxiliary information includes attributes of the message, e.g., link layer address, link layer type and transmission time of the message, and etc. It can be seen that besides the most frequently used characteristic information, i.e., source address and destination address of the message, the auxiliary information in the message may also be used as the characteristic information of the message. FIG. 10 is a flowchart of recovering a message returned by an IAC by using message characteristic information stored by the NFC in accordance with an embodiment of the present invention. As shown in FIG. 10, when the Method 30 is adopted for recovering the message returned by the IAC, the recovery procedure includes the following steps.

In step 1001, when receiving a message from an external device, the NFC extracts the characteristic information of the message and stores the characteristic information in an information storage unit which is referred to as information storage unit 1.

In the present invention, an information buffer pool can be set up in advance and all information storage units have been allocated in the information buffer pool. The size of each information storage unit is fixed. A serial number, i.e., an information storage unit ID, is assigned for each information storage unit, by which the information storage unit can be identified in the information buffer pool. For facilitating management of the information buffer pool, a status flag can also be set for each information storage unit for indicating whether the information storage unit is idle or occupied. When the status flag of an information storage unit is "occupied", it means that there is characteristic information stored in the information storage unit. When the life time of the characteristic information in an information storage unit exceeds a pre-set life time limit, the status flag of the information storage unit shall be changed into "idle", and new characteristic information will be allowed to be saved in the information storage unit. In this step, the information storage unit 1 is an idle information storage unit set up in advance in the information buffer pool.

In addition, according to the present invention, the information storage unit 1 is not necessarily be set up in advance, in which case the NFC may set up the information storage unit 1 dynamically in the pre-set information buffer pool or in a storage device according to the size of the characteristic information of the message. In other words, when the NFC needs to store characteristic information, the NFC allocates an information storage unit in the information buffer pool or directly in a storage device for storing the characteristic information, with the size of information storage unit being identical with the size of the characteristic information. The starting address and the size of the information storage unit may be used as the identity of the information storage unit.

It should be noted that in the present invention, step 1001 may be performed when the NFC receives a message from an external device for the first time and before the NFC judges whether to acquire the message in the redirection mode according to a condition of acquiring messages, or step 1001 may be performed after the NFC judges whether to acquire the message in the redirection mode according to the condition of acquiring messages and before the NFC replaces the source address and the destination addresses of the message in the redirection procedure.

In step 1002, after it is determined that the message is to be acquired in the redirection mode according to the condition of acquiring messages and after the source address and the destination addresses of the message are replaced in the redirection procedure, the NFC inserts the identity of the information storage unit 1 into the message in which the source address and the destination addresses have been replaced.

When the information storage unit 1 in step 1001 is an idle information storage unit pre-set in the information buffer pool, the identity of the information storage unit 1 in this step shall be the serial number of the information storage unit 1 in the information buffer pool.

When the information storage unit 1 in step 1001 is set up dynamically by the NFC according to the size of the message characteristic information, the identity of the information storage unit 1 in this step shall be the starting address and the size of the information storage unit 1.

In step 1003, the NFC inserts information of a predetermined waiting time threshold into the message in which the source address and the destination addresses have been replaced.

In practice, a time limit is usually imposed on the NFC concerning the time spent in processing the message passing through the NFC. For example, a message is required to stay within the NFC for not more than 0.1 second in order to satisfy the QoS requirement of the message. In the present invention, a waiting time threshold can be set in advance to prevent the NFC from processing the message for too long and thus meet the processing time limit of the message. In this step, the NFC inserts information of the waiting time threshold into the message after the source address and destination address of the message are replaced, which facilitates determining whether the time spent by the NFC in processing the message exceeds the time limit during succeeding processing based on the waiting time threshold.

In step 1004, the NFC obtains check information and inserts the check information obtained into the message in which the source address and the destination address have been replaced, and stores the check information in the information storage unit 1.

The check information is inserted into the message so that the NFC may check whether the message has been modified by the IAC according to the check information when the message is returned from the IAC, i.e., whether the contents of the message returned from the IAC are identical with the contents of the original message received by the NFC.

In this step, the check information obtained by the NFC may include a magic word determined in advance or a check code computed based on a specified field in the message.

In step 1005, the NFC redirects the message to a corresponding IAC.

It should be noted that, in practice, after the IAC performs proper service processing on the message redirected to the IAC, the IAC may return the message to the NFC or directly discard the message based on the processing result. If the message is discarded, the NFC will be unable to receive the message from the IAC. In order to avoid unnecessary waiting for a message and occupying storage resources for too long, the NFC may check whether the life time of the information storage unit 1 exceeds the life time limit after the characteristic information is stored in the information storage unit 1 in step 1001. If the life time of the information storage unit 1 exceeds the life time limit, the information storage unit 1 shall be cleared with the status flag of the information storage unit 1 being changed into "idle".

In step 1006, after receiving the redirected message, the IAC performs corresponding service processing on the message and sends the message processed which includes the identity of the information storage unit 1 and current check information to the NFC.

In this step, when the IAC receives the redirected message, the message includes the identity of the information storage unit 1, the waiting time threshold information and the check information.

In this step, if the IAC modified the contents of the message while processing the message, the IAC will also modify the check information in the message and the modified check information will be carried as the current check information in the processed message. However, if the IAC did not modify the contents of the message while processing the message, the IAC will take the check information in the original message received by the IAC as the current check information.

Therefore the message returned by the IAC to the NFC in this step also carries the identity of the information storage unit 1, the waiting time threshold information and the current check information.

In step 1007, after receiving the message from the IAC, the NFC calculates the length of time between the time of sending the message to the IAC and the time of receiving the message from the IAC, and judges whether the calculation result is smaller than the waiting time threshold in the message. If the calculation result is smaller than the waiting time threshold, the NFC will perform step 1008, otherwise the NFC will discard the message returned from the IAC and terminates the process.

In step 1008, the NFC obtains the check information from the information storage unit 1 according to the identity of the information storage unit 1 carried in the message from the IAC, and judges whether the check information in the information storage unit 1 is identical with the check information in the message returned by the IAC. If the check information is identical, the NFC performs step 1009, otherwise the NFC discards the message from the IAC and terminates the process.

In step 1009, the NFC obtains the characteristic information from the information storage unit 1 according to the identity of the information storage unit 1 carried in the message.

In step 1010, the NFC recovers the message returned from the IAC by using the characteristic information obtained.

The message is recovered by updating certain fields in the message by using the characteristic information obtained. For example, when the characteristic information includes the source address and the destination address of the original message, in this step, the NFC updates the source address and the destination address in the message returned by the IAC with the source address and the destination address. Or, when the characteristic information includes auxiliary information in the original message, in this step, the NFC directly stores a copy of the auxiliary information into the auxiliary information field in the message returned by the IAC.

In step 1011, the NFC continues service processing based on the recovered message.

In this step, the NFC continues with the service processing of the recovered message according to an original forwarding processing logic of the message.

In the process shown in FIG. 10, the NFC inserts a link to the characteristic information, i.e., the identity of the information storage unit 1 that stores the characteristic information, into the message to be redirected to the IAC, so that the original characteristic information of the message can be obtained according to the link to the characteristic information during succeeding procedure, and the message can thus be recovered. In practice, the NFC may not necessarily insert the link to the characteristic information into the redirected message as shown in FIG. 10, but insert the characteristic information directly into a specific location in the message to be redirected to the IAC, and the IAC also inserts the characteristic information into the specific location. After receiving the message returned by the IAC, the NFC recovers the message directly based on the characteristic information in the specific location of the message. Other information, such as the waiting time threshold and the check information, may still be processed in accordance with the process shown in FIG. 10.

It should be noted that in the flow shown in FIG. 10, when the message redirected by the NFC to the IAC carries a link to the characteristic information, the NFC preferably inserts the link to the characteristic information, the waiting time threshold information and the check information into the MAC address field, e.g., the SMAC or the DMAC field, or a new field in the message in which the source address and the destination address have been replaced. When the message carries the characteristic information, the NFC preferably inserts the characteristic information, the waiting time threshold information and the check information into the message header, or between the message header and the IP header, or into a new field, of the message in which the source address and the destination address have been replaced.

In the process as shown in FIG. 10, the characteristic information may include any or any combination of the auxiliary information, source address and destination address of the message.

Figure 11:
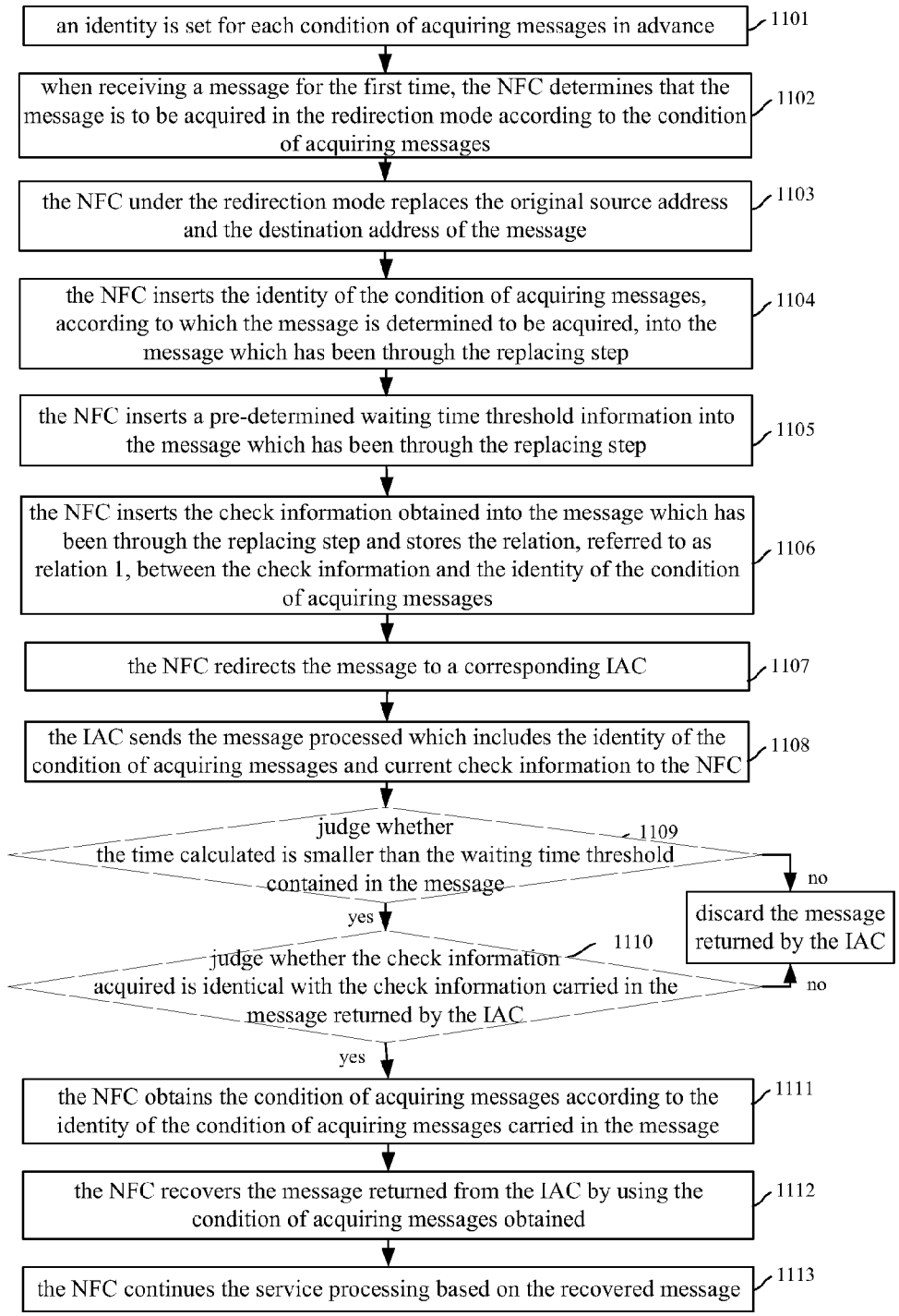
FIG. 11 is a flowchart of recovering a message returned from an IAC based on a message acquiring condition by an NFC in accordance with an embodiment of the present invention.

According to Method 31, in practice, a redirection rule shall be set in advance in the NFC to enable the redirection mode, and functions as the condition of acquiring messages in the communication under the redirection mode. The condition of acquiring messages may include the above mentioned acquiring rule including the message characteristic information and/or the association strategy including the network topology information. It can be seen that the rule of acquiring messages includes information with which the original message can be located. For example, when the condition of acquiring messages includes an acquiring rule, the characteristic information of the message can be obtained through the acquiring rule; when the condition of acquiring messages includes an association strategy, the original network topology information, e.g., source ingress interface and egress interface, of the message can be obtained through the association strategy. In this way, the NFC can recover the message completely based on the condition of acquiring messages, and obtain the characteristic information or the original forwarding interface of the message before the message is sent to the IAC. FIG. 11 is a flowchart of recovering a message returned from an IAC based on a condition of acquiring messages by an NFC in accordance with an embodiment of the present invention. As shown in FIG. 11, when Method 31 is adopted for recovering the message returned by the IAC, the recovery procedure may include the following steps.

In step 1101, an identity is set for each condition of acquiring messages in advance.

In step 1102, when receiving a message from an external device, the NFC determines that the message is to be acquired in the redirection mode according to the condition of acquiring messages.

In step 1103, the NFC under the redirection mode replaces the original source address and the destination address of the message.

In step 1104, the NFC inserts the identity of the condition of acquiring messages, according to which the message is determined to be acquired, into the message in which the source address and the destination address have been replaced.

Step 1105 is identical with step 1003.

In step 1106, the NFC obtains check information, inserts the check information obtained into the message and stores the relation, referred to as relation 1, between the check information and the identity of the condition of acquiring messages.

Step 1107 is identical with the step 1005.

In step 1108, after receiving the redirected message, the IAC performs corresponding service processing on the message and sends the message processed which includes the identity of the condition of acquiring messages and current check information to the NFC.

In this step, if the IAC modified the contents of the message while processing the message, the IAC will also modify the check information in the message, and the modified check information will be carried as the current check information by the message processed. However, if the IAC did not modify the contents of the message while processing the message, the IAC will take the check information in the original message received by the IAC as the current check information.

In this step, the message returned by the IAC to the NFC carries the identity of the condition of acquiring messages, the waiting time threshold information and the current check information.

In step 1109, after receiving the message from the IAC, the NFC calculates the length of time between the time of sending the message to the IAC and the time of receiving the message from the IAC, and judges whether the calculation result is smaller than the waiting time threshold contained in the message. If the calculation result is smaller than the waiting time threshold, the NFC will perform step 1110, otherwise the NFC will discard the message returned by the IAC and terminates the process.

In step 1110, the NFC acquires the check information according to the identity of the condition of acquiring messages carried in the message returned from the IAC and the relation 1 set in step 1106, and judges whether the check information acquired is identical with the check information carried in the message returned by the IAC. If the check information is identical, the NFC will perform step 111, otherwise the NFC will discard the message returned from the IAC and terminates the process.

In step 1111, the NFC obtains the condition of acquiring messages according to the identity of the condition of acquiring messages carried in the message.

In step 1112, the NFC recovers the message returned from the IAC by using the condition of acquiring messages obtained.

The message is recovered by using the message characteristic information or the network topology information in the condition of acquiring messages. To be specific, when the message characteristic information in the condition of acquiring messages includes the source address and the destination address of the original message, in this step, the NFC refreshes the source address and the destination address in the message returned by the IAC with the source address and the destination address obtained. When the message characteristic information in the condition of acquiring messages includes the auxiliary information in the original message, in this step, the NFC directly inserts a copy of the auxiliary information obtained into the auxiliary information field of the message returned by the IAC. When the condition of acquiring messages obtained includes the network topology information of the original message, the information of the original egress interface/ingress interface of the message shall be recovered.

In step 1113, the NFC continues the service processing based on the recovered message.

In this step, the NFC continues the service processing of the recovered message according to an original forwarding processing logic of the message.

In the flow shown in FIG. 11, the NFC inserts the identity of the condition of acquiring messages into the message to be redirected to the IAC, and obtains the condition of acquiring messages according to the identity of the condition of acquiring messages in the succeeding procedure for recovering the message. In practice, the NFC may not necessarily insert the identity of the condition of acquiring messages into the message to be redirected as shown in FIG. 11, but insert the condition of acquiring messages directly into a specific location in the message to be redirected to the IAC. The IAC also inserts the condition of acquiring messages into the specific location. After receiving the message returned by the IAC, the NFC recovers the message directly based on the condition of acquiring messages in the specific location of the message. Other information, such as the waiting time threshold and the check information, may still be processed as shown in FIG. 11.

It should be noted that in the flow shown in FIG. 11, no matter the message sent to the IAC carries the condition of acquiring messages or the identity of the condition of acquiring messages, the NFC may always insert the condition of acquiring messages or the identity of the condition of acquiring messages into the Routing Information Field (RIF) between the VLAN header and the data in the payload field, or into the channel ID field in the VLAN header, or into a new field.

It should also be noted that in the present invention, when the NFC and IACs support the mirror mode and/or the redirection mode at the same time, master/slave backup between different IACs may also be implemented with the master IAC and the slave IAC having the same condition of acquiring messages. In normal situations, the master IAC sends a message containing the condition of acquiring messages under the mirror mode and/or redirection mode to the NFC, and the NFC sends the messages fitting the condition of acquiring messages under the mirror mode and/or redirection mode to the master IAC of the IACs that are backup IACs of each other. The procedure of judging by the NFC whether the received message fits the condition of acquiring messages and transmitting the message to the master IAC has been explained in the preceding description of the communication procedure in the mirror mode, the redirection mode and the host mode. However, since the NFC normally sends the messages fitting the condition of acquiring messages to the master IAC, that is, the redirection destination interface corresponding to the condition of acquiring messages is the NFC side data interface connected to the master IAC, the redirection destination interface corresponding to the condition of acquiring messages stored in the NFC has to be updated when a master/slave switching is performed in the present invention, so that the NFC will not send the message fitting the condition of acquiring messages to the original master IAC after the master/slave switching, but to the new master IAC.

Figure 12:
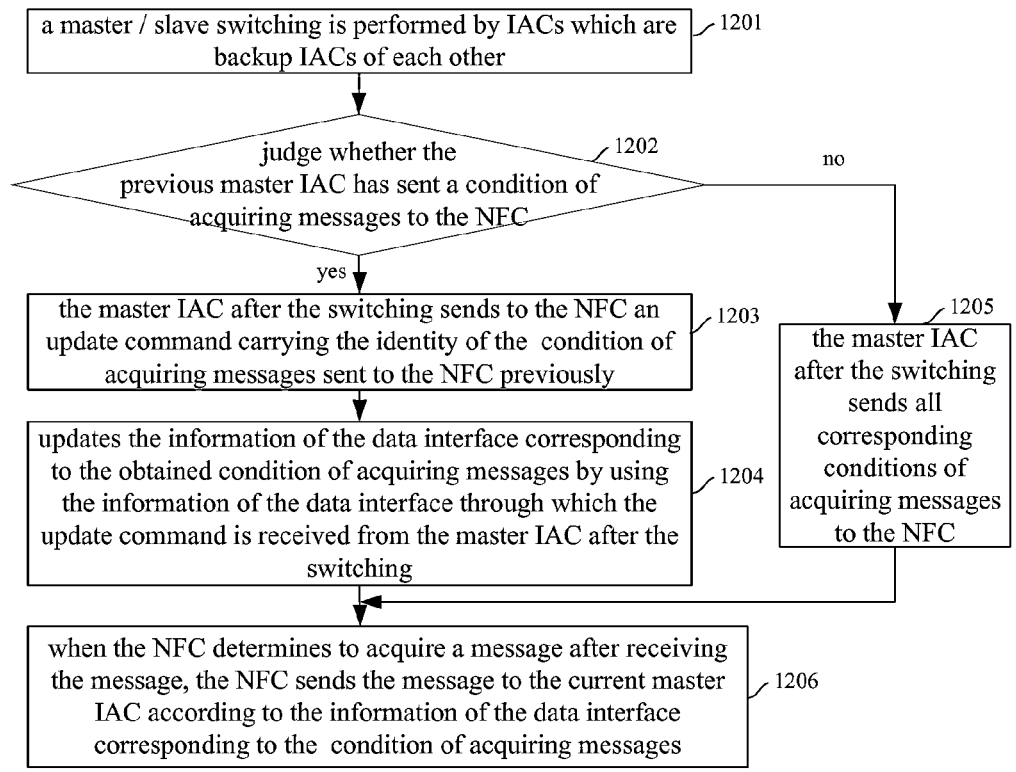
FIG. 12 is a flowchart of updating a redirection destination interface corresponding to a message acquiring condition after a master/slave switching in accordance with an embodiment of the present invention.

FIG. 12 is a flowchart of refreshing a redirection destination interface corresponding to a condition of acquiring messages after a master/slave switching in accordance with an embodiment of the present invention. As shown in FIG. 12, the updating procedure includes the steps described as follows.

In step 1201, a master/slave switching is performed by IACs which are backup IACs of each other.

In step 1202, the new master IAC after the switching judges whether the previous master IAC has sent a condition of acquiring messages of the previous master IAC to the NFC. If determining the previous master IAC has sent a condition of acquiring messages, the new master IAC performs step 1203, otherwise performs step 1205.

The procedure of judging by the new master IAC whether the previous master IAC has sent a condition of acquiring messages corresponding to the previous master IAC to the NFC may include the following steps. The new master IAC sends a request for acquiring the condition of acquiring messages carrying the identity of the previous master IAC to the NFC. When the NFC has stored the condition of acquiring messages corresponding to the identity of the previous master IAC, the NFC sends the identity of the condition of acquiring messages corresponding to the previous master IAC to the new master IAC in response to the request. After receiving the response carrying the identity of the condition of acquiring messages corresponding to the previous master IAC, the new master IAC determines that the previous master IAC has sent the condition of acquiring messages of the previous master IAC to the NFC. When the NFC has not stored any condition of acquiring messages corresponding to the identity of the previous master IAC, i.e., the previous master IAC did not send any condition of acquiring messages to the NFC, the NFC sends an empty response to the new master IAC. When receiving the empty response, the new IAC determines that the previous master IAC did not send any condition of acquiring messages corresponding to the previous master IAC to the NFC.

In step 1203, the new master IAC sends to the NFC an update command carrying the identity of the condition of acquiring messages sent to the NFC previously.

In step 1204, the NFC obtains the condition of acquiring messages according to the identity in the update command and replaces the information of the data interface corresponding to the obtained condition of acquiring messages with the information of the data interface through which the update command is received from the new master IAC. Then the NFC proceeds to step 1206.

In step 1205, the new master IAC sends all condition of acquiring messages corresponding to the new master IAC to the NFC.

In step 1206, when the NFC determines to acquire a message after receiving the message from an external device, the NFC sends the message to the master IAC according to the information of the data interface corresponding to the condition of acquiring messages.

It should be noted that in the present invention, when the NFC and the IAC are communicating in the mirror mode and/or the redirection mode, different IACs may also share workloads based on different service groups besides performing master/slave switching, hence the master IAC and the slave IACs which are backup IACs of each other as shown in FIG. 12 may be a master IAC and slave IACs for a service group. When a master/slave switching is performed for a service group, e.g., service group 1, in the process shown in FIG. 12, the new master IAC of service group 1 after the switching triggers the NFC to update the condition of acquiring messages corresponding to service group 1.

Finally, the communication procedure in the pass-through mode is explained.

When the cooperation mode configured for an NFC and an IAC includes the pass-through mode, the communication procedure between the NFC and the IAC may include steps as follows. The IAC receives a message from the NFC, processes the message received and, if the message needs to be forwarded, forwards the message from the NFC to another network device through an external Ethernet interface set up in the IAC in advance. The IAC further receives messages for the NFC from other network devices through the external Ethernet interface, performs proper service processing on the messages to be sent to the NFC and forwards the messages to the NFC when necessary.

It should also be noted that in the present invention, the cooperation mode of the NFC and the IAC may be changed according to practical service needs at any time through the procedure of setting the cooperation mode and the cooperation mode-related configuration information for the NFC and the IAC in the above second step. For example, the communication mode between the NFC and the IAC may be changed from the host mode to the redirection mode according to the practical service needs.

Figure 13:
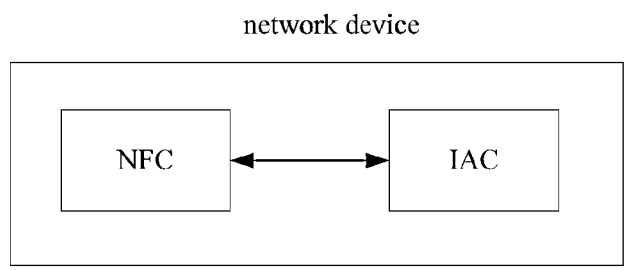
FIG. 13 is a schematic illustrating an elementary structure of a network device in accordance with an embodiment of the present invention.

The present invention also provides a network device. FIG. 13 is a schematic illustrating an elementary structure of the network device in accordance with an embodiment of the present invention. As shown in FIG. 13, the network device in accordance with the present invention includes: an NFC for forwarding messages and more than one IAC providing other service capabilities.

The NFC is adapted to connect with the IACs to obtain the cooperation mode and the cooperation mode-related configuration information, to transmit service information to the IACs according to the cooperation mode and the cooperation mode-related configuration information, and to receive the service information from the IACs.

An IAC is adapted to connect with the NFC to obtain the cooperation mode and the cooperation mode-related configuration information, to transmit service information to the NFC according to the cooperation mode and the cooperation mode-related configuration information, and to receive service information from the NFC.

Figure 14:
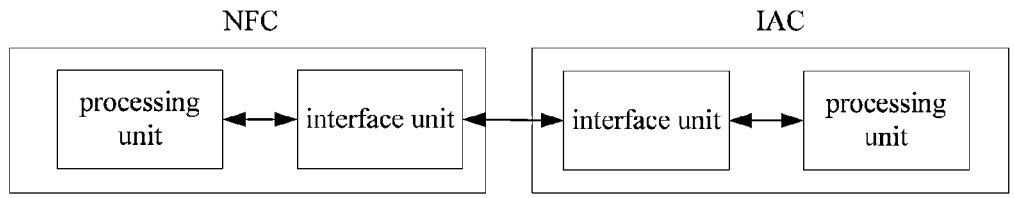
FIG. 14 is a schematic illustrating a detailed structure of a network device in accordance with an embodiment of the present invention.

FIG. 14 is a schematic illustrating a detailed structure of the network device in accordance with an embodiment of the present invention. As shown in FIG. 14, each of the NFC and the IAC in the network device may include a processing unit and an interface unit.

The processing unit of the NFC is adapted to obtain the cooperation mode and the cooperation mode-related configuration information from the interface unit of the NFC, to transmit service information to the interface unit of the NFC according to the cooperation mode and the cooperation mode-related configuration information, and to receive and process the service information from the IAC received by the interface unit of the NFC.

The processing unit of the IAC is adapted to obtain the cooperation mode and the cooperation mode-related configuration information from the interface unit of the IAC, to transmit service information to the interface unit of the IAC according to the cooperation mode and the cooperation mode-related configuration information, and to receive and process the service information from the NFC received by the interface unit of the IAC.

The service information includes messages and control information exchanged between the NFC and the IAC. The messages may include messages exchanged between the NFC and the IAC, for example, messages carrying a condition of acquiring messages, messages carrying a rule of message processing, messages generated during a master/slave switching, and messages from external network devices. The control information may include, for example, configuration information in different modes.

Figure 15:
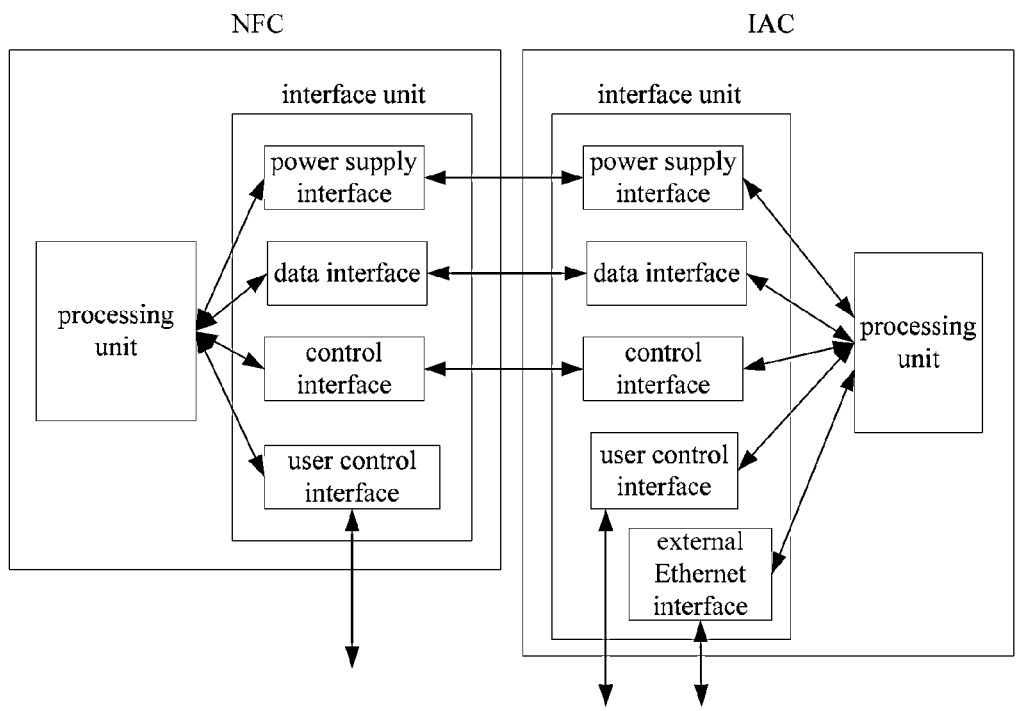
FIG. 15 is a schematic illustrating a detailed structure of a network device with focus on interface units of an NFC and an IAC in accordance with an embodiment of the present invention.

FIG. 15 is a schematic illustrating a detailed structure of a network device with focus on interface units of an NFC and an IAC in accordance with an embodiment of the present invention. As shown in FIG. 15, each of the interface units of the NFC and the IAC in the network device basically includes: a user control interface, a data interface and a control interface.

The user control interface of the NFC is adapted to receive the cooperation mode and the cooperation mode-related configuration information of the NFC from an administrative terminal and send the cooperation mode and the cooperation mode-related configuration information to the processing unit of the NFC.

The data interface of the NFC is adapted to send messages from the processing unit of the NFC to the data interface of the IAC and send messages from the data interface of the IAC to the processing unit of the NFC.

The control interface of the NFC is adapted to send control information from the processing unit of the NFC to the control interface of the IAC and send control information from the control interface of the IAC to the processing unit of the NFC.

The user control interface of the IAC is adapted to receive the cooperation mode and the cooperation mode-related configuration information of the IAC from the administrative terminal and send the cooperation mode and the cooperation mode-related configuration information to the processing unit of the IAC.

The data interface of the IAC is adapted to send messages from the processing unit of the IAC to the data interface of the NFC and send messages from the data interface of the NFC to the processing unit of the IAC.

The control interface of the IAC is adapted to send control information from the processing unit of the IAC to the control interface of the NFC and send control information from the control interface of the NFC to the processing unit of the IAC.

Figure 16:
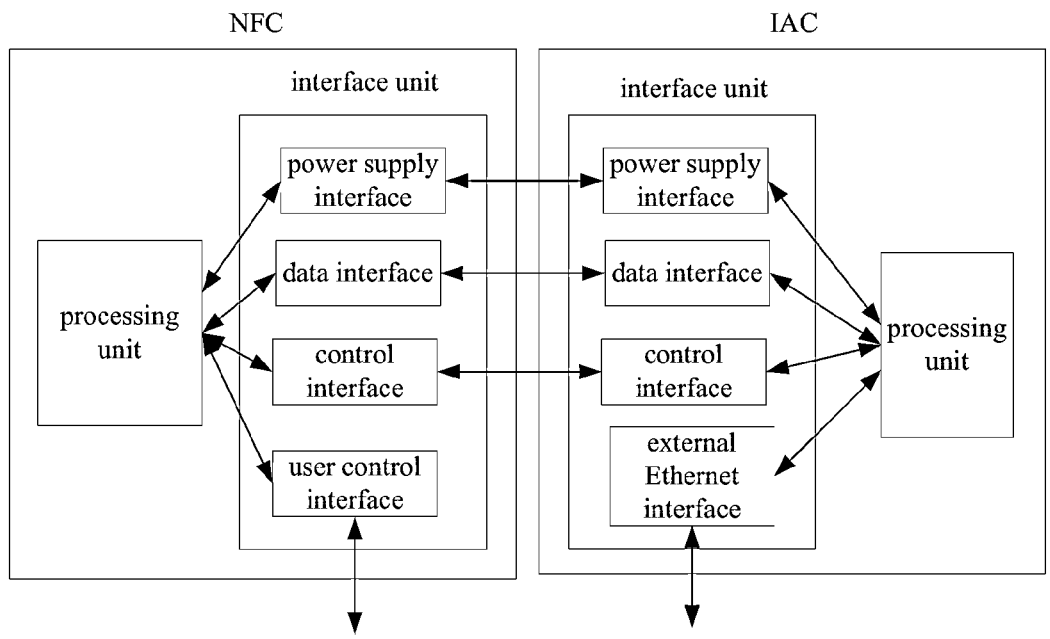
FIG. 16 is a schematic illustrating a detailed structure of a network device with focus on interface units of an NFC and an IAC in accordance with an embodiment of the present invention.

FIG. 16 is another schematic illustrating a detailed structure of a network device with focus on interface units of an NFC and an IAC in accordance with an embodiment of the present invention. As shown in FIG. 16, the interface unit of any of the NFC and the IAC may include: a data interface and a control interface, and the interface unit of the NFC may further include a user control interface.

The user control interface of the NFC is adapted to send a cooperation mode and the cooperation mode-related configuration information of the NFC from an administrative terminal to the processing unit of the NFC and send the cooperation mode and the cooperation mode-related configuration information of the IAC from the administrative terminal to the control interface of the NFC.

The data interface of the NFC is adapted to send messages from the processing unit of the NFC to the data interface of the IAC, and send messages from the data interface of the IAC to the processing unit of the NFC.

The control interface of the NFC is adapted to send the control information and the cooperation mode and the cooperation mode-related configuration information of the IAC to the control interface of the IAC, and send the control information from the control interface of the IAC to the processing unit of the NFC.

The data interface of the IAC is adapted to send messages from the processing unit of the IAC to the data interface of the NFC and send messages from the data interface of the NFC to the processing unit of the IAC.

The control interface of the IAC is adapted to send control information from the processing unit of the IAC to the control interface of the NFC and send the control information and the cooperation mode and the cooperation mode-related configuration information of the IAC received to the processing unit of the IAC.

In the network device of the present invention, the user control interface may be a Console port, or an Aux port, or a physical port supporting Telnet-based login.

As shown in FIG. 15 or 16, the interface unit of any of the NFC and the IAC in the network device of the present invention preferably includes: a power supply interface. The power supply interface of the NFC is adapted to provide internal power supply of the NFC for the IAC via the power supply interface of the IAC. In accordance with the present embodiment, the IAC in the network device may not need external power supply since the NFC may provide power supply for the IAC via the power supply interface, hence the structure of the IAC is simplified.

As shown in FIG. 14, in the network device of the present invention, in order to implement the communication in the host mode between the NFC and the IAC, the processing unit of the NFC is adapted to acquire the host mode information and the IP address of the IAC in the host mode from the cooperation mode-related configuration information sent by the user control interface of the NFC, judge whether the destination IP address in a message received from an external device is identical with the IP address of the IAC, or judge whether the destination MAC address in a message received from an external device is identical with the MAC address of the IAC, and if the destination IP address is identical with the IP address of the IAC or the destination MAC address is identical with the MAC address of the IAC, forward the message to the data interface of the NFC connected to the IAC. The processing unit of the NFC is further adapted to send a message from the data interface of the NFC to the corresponding network device based on the destination IP address or the destination MAC address of the message.

Referring to FIG. 14, in order to enable the NFC and the IAC in the network device to communicate in the mirror mode and/or redirection mode, the processing unit of the NFC is further adapted to receive a condition of acquiring messages, to obtain the mirror mode and/or redirection mode information from the cooperation mode-related configuration information received from the user control interface of the NFC, to judge whether a message received is to be acquired according to the condition of acquiring messages, and to forward the message directly if determining the message is not to be acquired, or to send the message to the data interface of the NFC after replacing the source address and destination address in the message if determining the message is to be acquired.

Referring to FIG. 15 or 16, the interface unit of the IAC in the network device of the present invention may further include an external Ethernet interface.

The processing unit of the IAC is adapted to obtain pass-through mode information from the cooperation mode-related configuration information received from the control interface of the IAC, receive a message sent from the NFC to another network device by the data interface of the IAC, process the message, and forward the message to the another network device through the external Ethernet interface when the message needs to be forwarded. The processing unit of the IAC is adapted further to receive a message for the NFC through the external Ethernet interface from an external network device, process the message and forward the message to the data interface of the IAC when the message needs to be forwarded.

It should be noted that the network device of the present invention may include multiple IACs, and the IACs may be backup IACs of each other as a master IAC and slave IACs. In such case, it is always the master IAC that interacts with the NFC to exchange service information.

Figure 17:
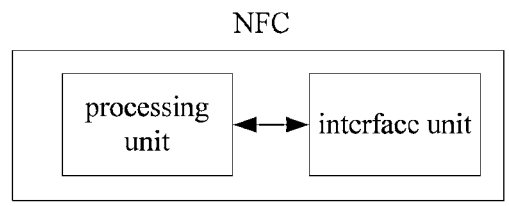
FIG. 17 is a schematic illustrating an elementary internal structure of an NFC in accordance with an embodiment of the present invention.

The present invention also provides an NFC. FIG. 17 is a schematic illustrating an elementary internal structure of an NFC in accordance with an embodiment of the present invention. As shown in FIG. 17, the NFC mainly includes a processing unit and an interface unit.

The processing unit is adapted to obtain the cooperation mode and cooperation mode-related configuration information from the interface unit, transmit service information to the interface unit according to the cooperation mode and the cooperation mode-related configuration information, and receive and process service information of the IAC sent by the interface unit.

The interface unit is adapted to receive the cooperation mode and the cooperation mode-related configuration information, send the cooperation mode and the cooperation mode-related configuration information to the processing unit, forward the service information from the processing unit to the IAC, and forward service information from the IAC to the processing unit.

Figure 18:
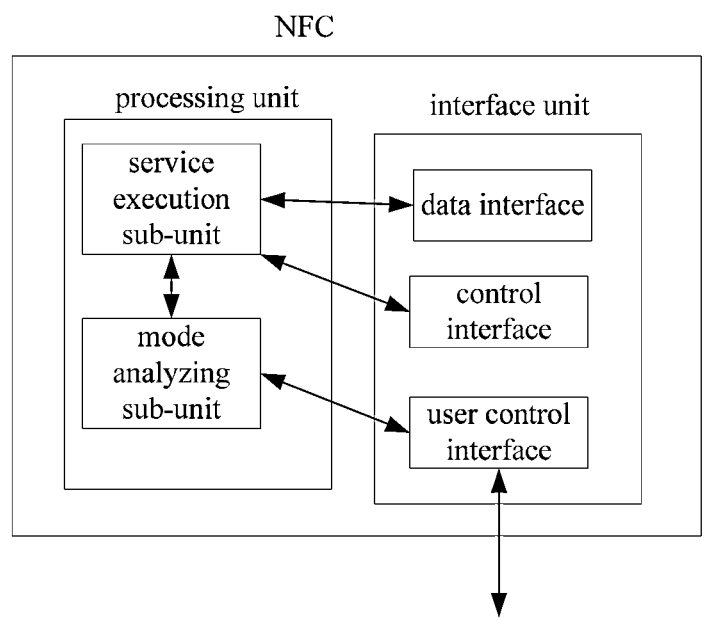
FIG. 18 is a schematic illustrating a detailed internal structure of an NFC in accordance with an embodiment of the present invention.

FIG. 18 is a schematic illustrating a detailed internal structure of the NFC in accordance with the present invention. As shown in FIG. 18, the interface unit in the NFC may include: a user control interface, a data interface and a control interface.

The user control interface is adapted to receive the cooperation mode and the cooperation mode-related configuration information, send the cooperation mode and the cooperation mode-related configuration information to the processing unit, forward the service information from the processing unit to the IAC, and forward service information from the IAC to the processing unit.

The data interface is adapted to send a message from the processing unit to the IAC and send a message from the IAC to the processing unit.

The control interface is adapted to send control information from the processing unit to the IAC and send control information from the IAC to the processing unit.

As shown in FIG. 18, the user control interface is further adapted to send the cooperation mode and cooperation mode-related configuration information for the IAC from the administrative terminal to the control interface, and the control interface is further adapted to send the cooperation mode and cooperation mode-related configuration information for the IAC received from the user control interface to the IAC.

As shown in FIG. 18, the processing unit in the NFC may further include a mode analyzing sub-unit and a service execution sub-unit.

The mode analyzing sub-unit and the service execution sub-unit may respectively include functions as follows.

The mode analyzing sub-unit is adapted to receive information from the user control interface, analyze the information to obtain information including the host mode information and the IP address of the IAC in the host mode, store the information and send a host mode service execution command to the service execution sub-unit.

The service execution sub-unit is adapted to judge, after receiving the host mode service execution command, whether the destination IP address in a message received from an external network device is identical with the IP address of the IAC stored in the mode analyzing sub-unit, or judge whether the destination MAC address in the message received from an external device is identical with the MAC address of the IAC stored in the mode analyzing sub-unit. If the IP addresses/MAC addresses are not identical, the service execution sub-unit forwards the message directly, or if the IP addresses/MAC addresses are identical, the service execution sub-unit sends the message to the data interface. After receiving a message from the data interface, the service execution sub-unit is adapted to send the message to a corresponding network device according to the destination IP address or the destination MAC address in the message, and exchange control information with the IAC via the control interface.

Or, the mode analyzing sub-unit and the service execution sub-unit may respectively function as follows.

The mode analyzing sub-unit is adapted to receive information from the user control interface unit, after analyzing the information which includes the mirror mode and/or redirection mode information, send a mirror mode and/or redirection mode service execution command to the service execution sub-unit.

The service execution sub-unit is adapted to obtain a condition of acquiring messages, receive the mirror mode and/or redirection mode service execution command, judge based on the condition of acquiring messages whether a message received from an external network device is to be acquired. If determining the message is not to be acquired, the service execution sub-unit forwards the message directly; if determining the message is to be acquired, the service execution sub-unit sends the message to the data interface. After receiving a redirection mode service execution command, the service execution sub-unit is adapted to recover the message returned via the data interface by the IAC and forward the recovered message.

Or, the mode analyzing sub-unit and the service execution sub-unit may respectively function as follows.

The mode analyzing sub-unit is adapted to receive information from the user control interface unit, analyze the information which includes pass-through mode information, and send a pass-through mode service execution command to the service execution sub-unit.

The service execution sub-unit is adapted to exchange messages with other network devices through the data interface after receiving the pass-through mode service execution command.

Figure 19:
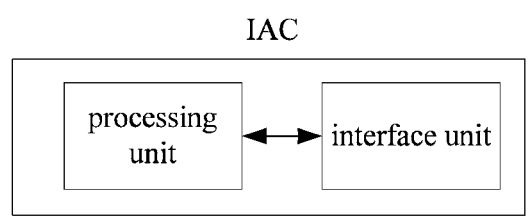
FIG. 19 is a schematic illustrating an elementary internal structure of an IAC in accordance with an embodiment of the present invention.

The present invention also provides an IAC. FIG. 19 is a schematic illustrating an elementary internal structure of an IAC in accordance with an embodiment of the present invention. As shown in FIG. 19, the IAC may include a processing unit and an interface unit.

The processing unit is adapted to obtain cooperation mode and the cooperation mode-related configuration information from the interface unit, transmit service information to the interface unit according to the cooperation mode and the cooperation mode-related configuration information, and receive and process service information of the NFC from the interface unit.

The interface unit is adapted to receive the cooperation mode and the cooperation mode-related configuration information, send the cooperation mode and the cooperation mode-related configuration information to the processing unit, forward service information from the processing unit to the NFC, and forward service information from the NFC to the processing unit.

Figure 20:
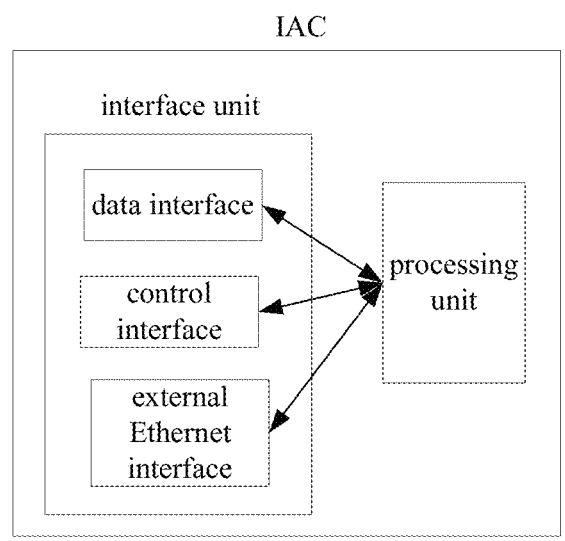
FIG. 20 is a schematic illustrating a detailed internal structure of an IAC in accordance with an embodiment of the present invention.

FIG. 20 is a schematic illustrating a detailed internal structure of an IAC in accordance with an embodiment of the present invention. As shown in FIG. 20, the interface unit in the IAC may include: a data interface and a control interface.

The data interface is adapted to send a message from the processing unit to the NFC and send a message from the NFC to the processing unit.

The control interface is adapted to send control information from the processing unit to the NFC, send control information from the NFC to the processing unit, and send the cooperation mode and cooperation mode-related configuration information from the NFC to the processing unit.

As shown in FIG. 20, the processing unit in the IAC is adapted to send a condition of acquiring messages to the control interface, and the control interface is adapted to send the condition of acquiring messages to the NFC.

As shown in FIG. 20, the interface unit in the IAC may further include an external Ethernet interface and in such circumstance, the processing unit is further adapted to send a message from the NFC to the external Ethernet interface and send a message from the external Ethernet interface to the NFC.

The external Ethernet interface is adapted to send a message received form an external network device to the processing unit, and send a message from the processing unit to the external network device.

And it should be especially noted that the messages received by the NFC in the present invention may include messages from external network devices and messages from an IAC connected to the NFC. The NFC performs service processing in any or any combination of the host mode, the mirror mode, the redirection mode and the pass-through mode in accordance with the present invention no matter whether message is from an external network device or an IAC.

The invention claimed is:

1. A network device comprising:
  a Network Forwarding Component (NFC) to forward received messages to a destination, wherein the NFC includes a processor, internal interface lines connectable to Independent Application Components (IACs), and an external interface line; and
  Independent Application Components (IACs) integrated with the NFC via the internal lines, wherein the IACs are to perform services,
  wherein the NFC is to receive cooperation mode configuration instructions via the external interface line for each of the IACs to configure each IAC in a cooperation mode comprising a host mode, a mirror mode, a redirection mode or a pass-through mode, and
  wherein a plurality of the IACs are configured in different cooperation modes.

2. The network device of claim 1, wherein an IAC of the IACs is configured in the host mode, and the NFC forwards a received message to the IAC via the internal line connected to the IAC if the processor determines a destination address of the message is equivalent to an address of the IAC.

3. The network device of claim 1, wherein an IAC of the IACs is configured in the mirror mode, and the NFC generates a duplicate copy of a received message and forwards the duplicate copy to the IAC via the internal line connected to the IAC if the processor determines the message satisfies a mirror condition.

4. The network device of claim 1, wherein an IAC of the IACs is configured in the redirection mode, and the NFC forwards a received message to the IAC via the internal line connected to the IAC if the processor determines the message satisfies a redirection condition.

5. The network device of claim 4, wherein the IAC in the redirection mode processes the message to determine whether to discard the message or return the message to the NFC, and the NFC sends the message towards its destination in response to receiving the returned message from the IAC and the message is unchanged.

6. The network device of claim 1, wherein an IAC of the IACs is configured in the pass-through mode, and the IAC in the pass-through mode is connected to the NFC via a penetration channel, and a received message is forwarded from the NFC to the IAC via the penetration channel without the NFC processing the message to determine whether the IAC has an address equivalent to a destination address of the message.

7. The network device of claim 6, wherein the IAC returns the received message to the NFC, and the returned message appears to the NFC to be received directly from an external device, and the NFC is to forward the returned message towards its destination.

8. The network device of claim 7, wherein the IAC is to analyze the message from the NFC and modify the message prior to returning the message to the NFC if a predetermined condition is met.

9. The network device of claim 6, wherein the penetration channel is treated as a Layer-2 Ethernet interface by the IAC and the IAC treats a forwarding channel for forwarding messages from the IAC to the NFC as a Layer-3 Ethernet interface.

10. A network device comprising:
   a Network Forwarding Component (NFC) to forward received messages to destinations via a network, wherein the NFC includes a processor, internal interface lines connectable to Independent Application Components (IACs), and a data storage; and
   Independent Application Components (IACs) connected with the NFC via the internal lines, wherein the IACs are to perform services,
   wherein the data storage is to store a relation between each internal interface line and the IAC connected to the internal interface line, wherein the relation includes an identifier (ID) for the IAC and an ID for the internal interface line connected to the IAC,
   wherein each of the IACs are configured in a cooperation mode comprising at least one of a host mode, a mirror mode, a redirection mode and a pass-through mode, and instructions for configuring each IAC in a cooperation mode are sent to each IAC from the NFC according to the stored relations.

11. The network device of claim 10, wherein a plurality of the IACs are configured in different cooperation modes.

12. The network device of claim 10, wherein the NFC is to acquire the IDs of the IACs, and wherein the instructions for configuring each IAC in a cooperation mode are received from an external interface line and include an IAC ID for each IAC to be configured.

13. The network device of claim 12, wherein in response to receiving an instruction for configuring an IAC of the ICs via the external interface line, the NFC is to determine the IAC ID of the IC from the instruction, determine the corresponding internal interface line for the IAC from the stored relation for the corresponding internal interface line, and send an instruction to the IAC via the determined corresponding internal interface line to the IAC to configure the IAC in a cooperation mode specified in the instruction.

14. The network device of claim 13, wherein the IAC includes a core, and the core receives the instruction via the corresponding internal interface line and sets the IAC to the cooperation mode specified in the instruction and sets cooperation mode-related configuration information supported by the IAC for the specified cooperation mode.

15. The network device of claim 12, wherein the external interface line is connected to a user interface or an external terminal.

16. The network device of claim 10, wherein the NFC is to perform message delivery functions of a router or a network switch.

17. The network device of claim 10, wherein the NFC comprises:
   a board in a main body; and
   slots to receive the IACs.

18. The network device of claim 10, comprising Interface Linkage Components (ILCs) connecting the NFC with the IACs, wherein the ILCs includes the internal interface lines of the NFC and internal interface lines of each IAC connected to the internal interface lines of the NFC.

19. The network device of claim 18, wherein the ILCs include data and command lines for the internal interface lines of the NFC and the IACs.

20. A method comprising:
   storing relations between each of a plurality of internal interface lines connecting a Network Forwarding Component (NFC) with Independent Application Components (IACs) in a network device, wherein each relation includes an identifier (ID) for the IAC and an ID for the internal interface line connected to the IAC;
   determining instructions to configure each of the IACs in a cooperation mode comprising at least one of a host mode, a mirror mode, a redirection mode and a pass-through mode; and
   for each IAC, determining, according to the stored relation for the IAC, the internal interface line connected to the IAC, and sending the instructions for configuring the IAC from the NFC to the IAC via the determined internal interface line.

* * * * *